United States Patent [19]

Yoshida et al.

[11] Patent Number: 5,046,059

[45] Date of Patent: Sep. 3, 1991

[54] MULTIPLE DISC PLAYER WITH MECHANISM FOR CHANGING OF DISCS

[75] Inventors: Susumu Yoshida; Kiyoshi Morikawa; Seiichio Matsuki; Testuro Kamimura, all of Kawagoe, Japan

[73] Assignee: Pioneer Electronic Corporation, Tokyo, Japan

[21] Appl. No.: 209,317

[22] Filed: Jun. 21, 1988

[30] Foreign Application Priority Data

Aug. 22, 1987 [JP] Japan ............................ 62-208763
Aug. 22, 1987 [JP] Japan ............................ 62-208766

[51] Int. Cl.⁵ .................... G11B 17/04; G11B 17/22; G11B 33/02
[52] U.S. Cl. ............................ 369/36; 369/38; 369/75.2
[58] Field of Search ............ 369/34, 35, 36, 37, 369/38, 75.1, 75.2, 77.1

[56] References Cited

U.S. PATENT DOCUMENTS

| | | | |
|---|---|---|---|
| 4,691,309 | 9/1987 | Suzuki | 369/38 |
| 4,701,900 | 10/1987 | Hasegawa et al. | 369/38 X |
| 4,764,917 | 8/1988 | Sugihara et al. | 369/77.1 |
| 4,841,499 | 6/1989 | Takahashi et al. | 369/38 |

FOREIGN PATENT DOCUMENTS 61-261853 11/1986 Japan .

Primary Examiner—Stuart S. Levy
Assistant Examiner—Kenneth B. Wells
Attorney, Agent, or Firm—Fleit, Jacobson, Cohn, Price, Holman & Stern

[57] ABSTRACT

A multiple-disc player includes a player housing in which a disc holder housing discs held on respective plate-like trays is loaded. Desired discs are selected and transferred successively from the disc holder onto the disc carrying surface of a turntable by a disc pickup/transfer mechanism for continuous disc playback operation. A playback means including the turntable is supported on a support member through a vibration-resistant mechanism. The support member is movable between retracted and unretracted positions with respect to the trays as they are pushed out of the disc holder. When the support member is in the unretracted position, the playback means is fixed to the player housing by a lock mechanism for increased resistance to vibration.

12 Claims, 26 Drawing Sheets

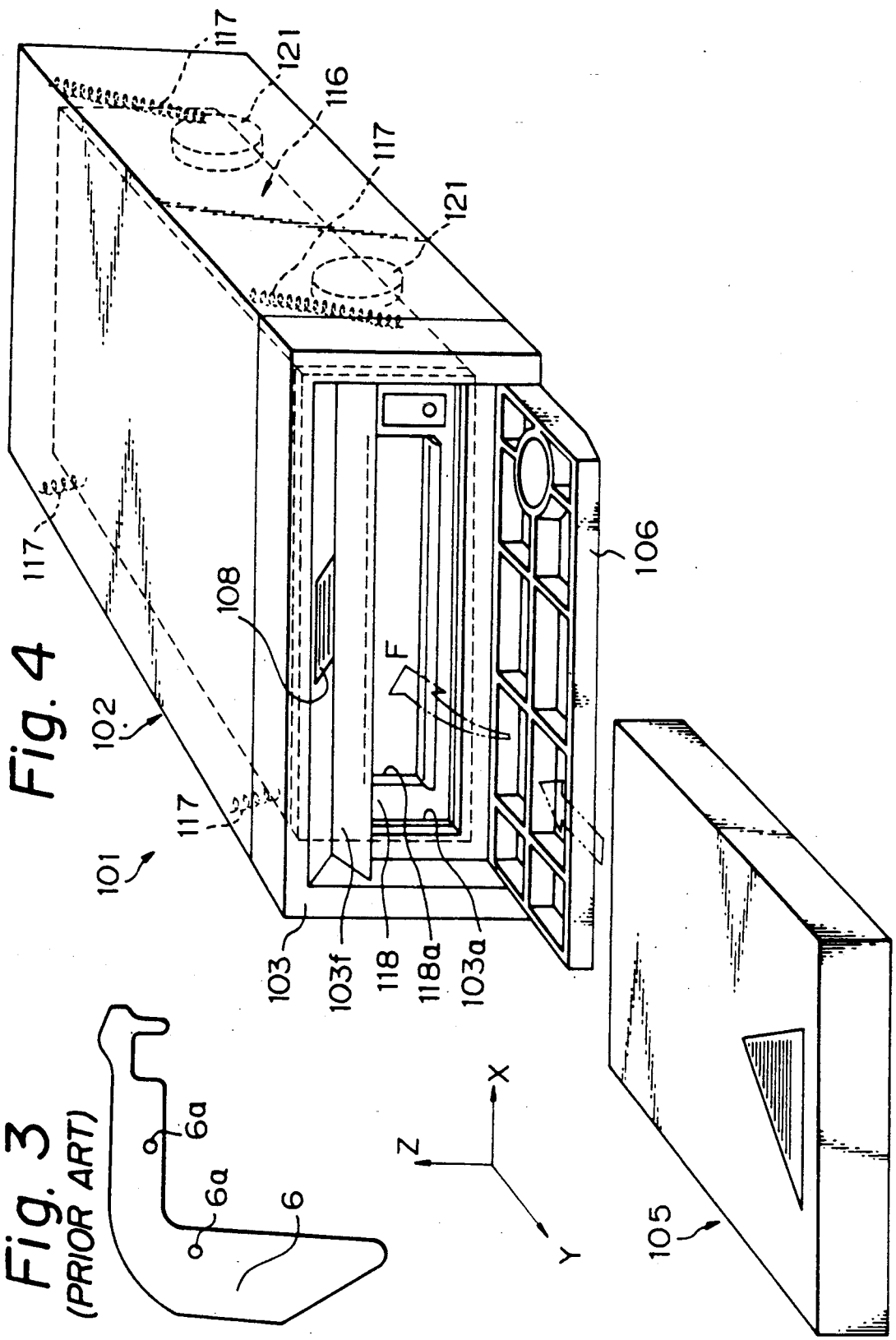

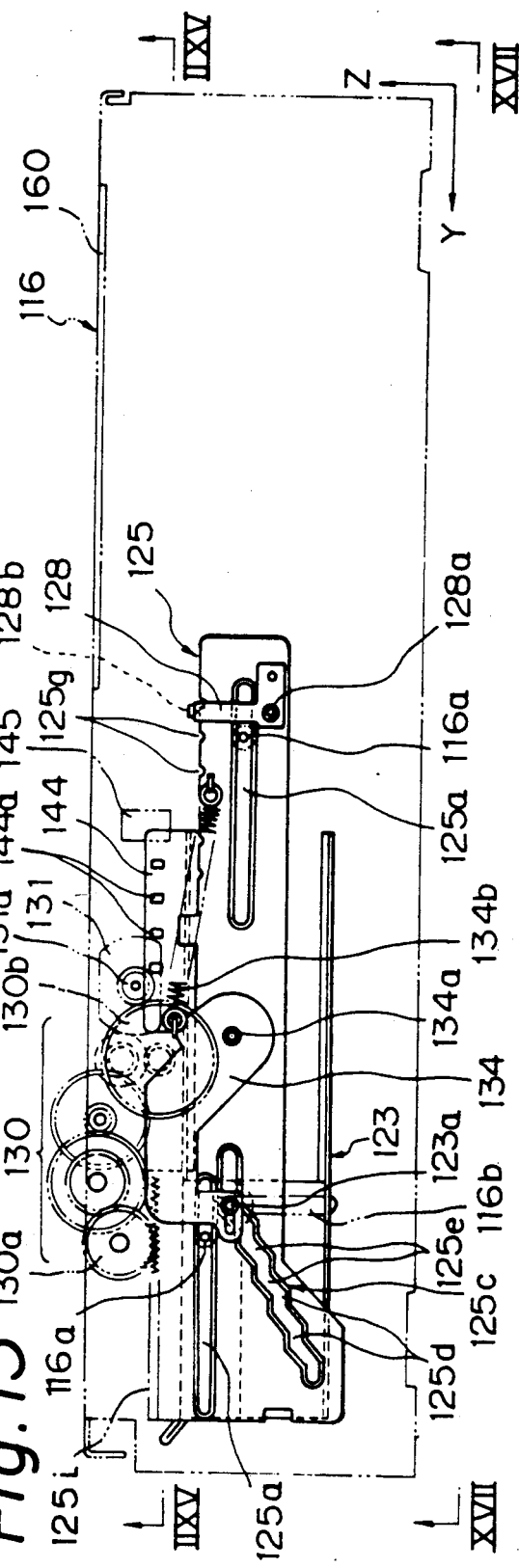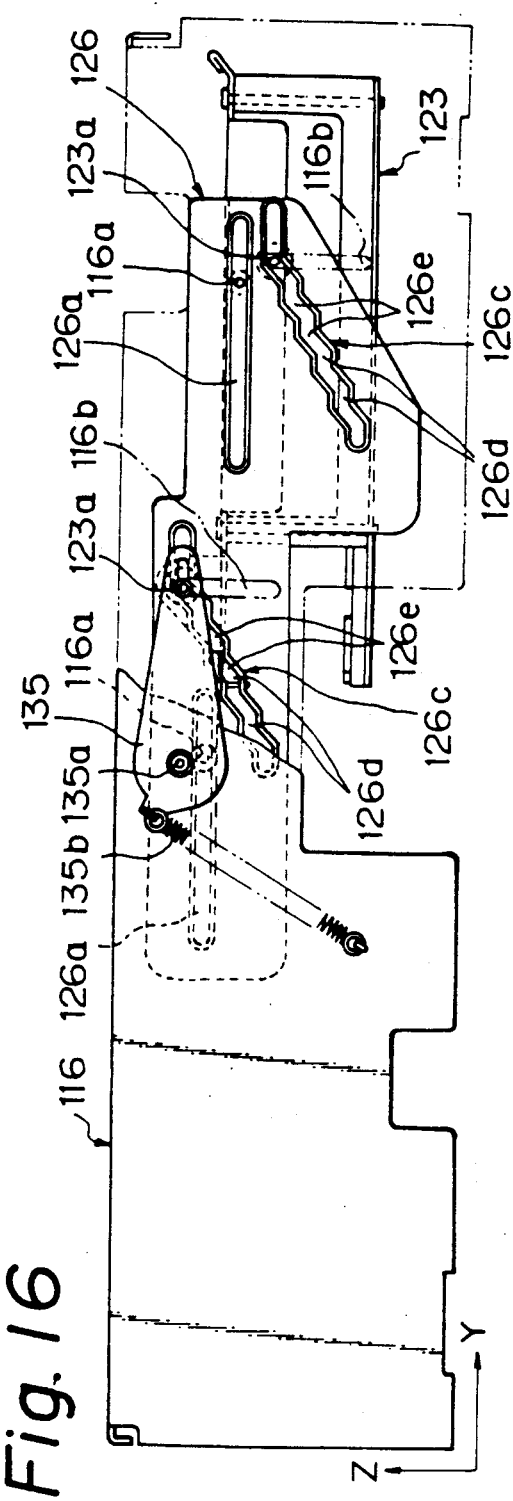

Fig. 22c
Fig. 22a
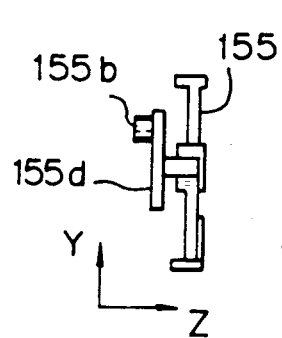
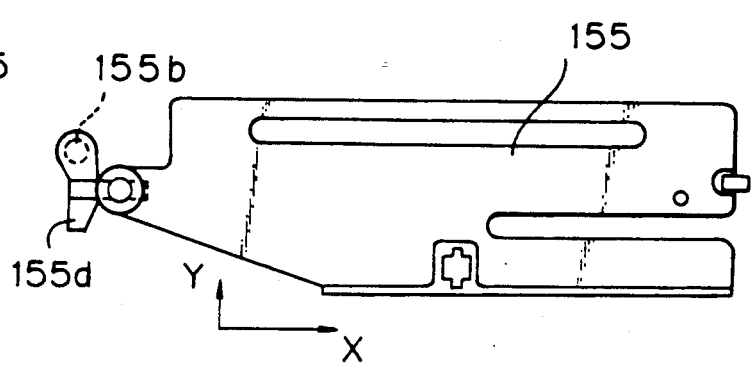
Fig. 22b
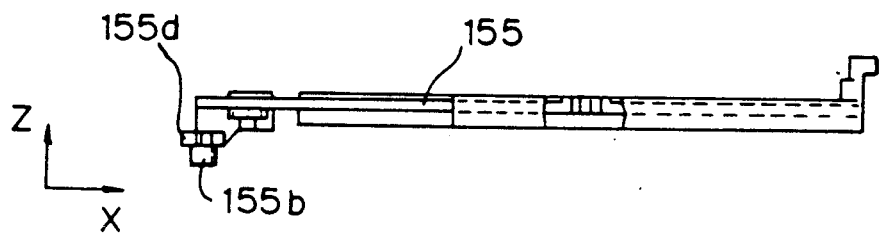

Fig. 29
Fig. 30
Fig. 31
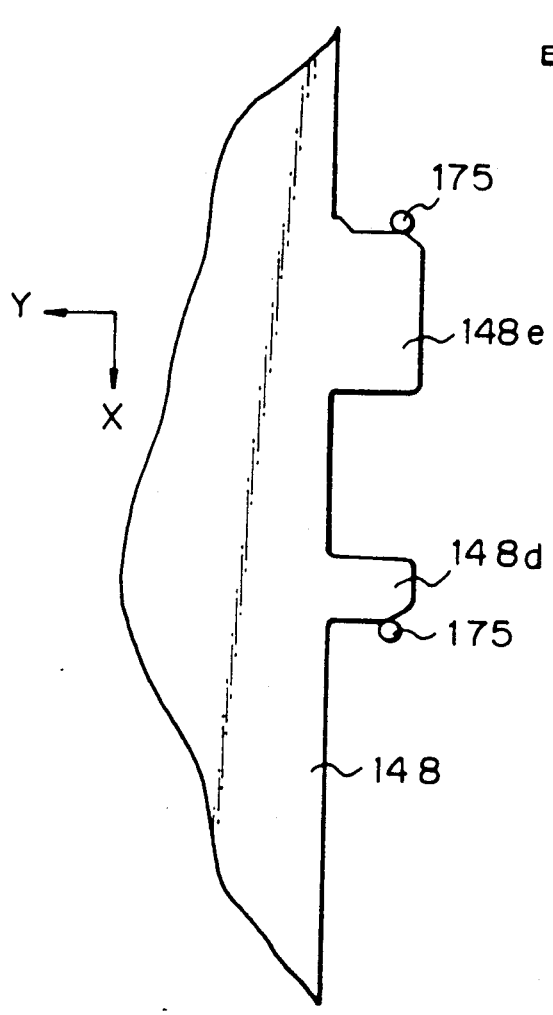
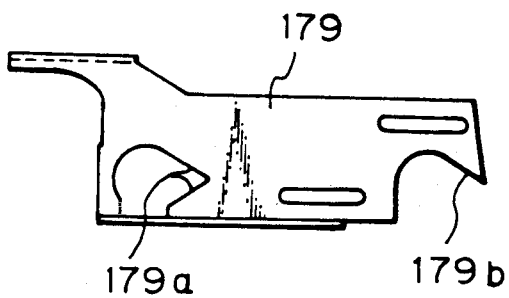
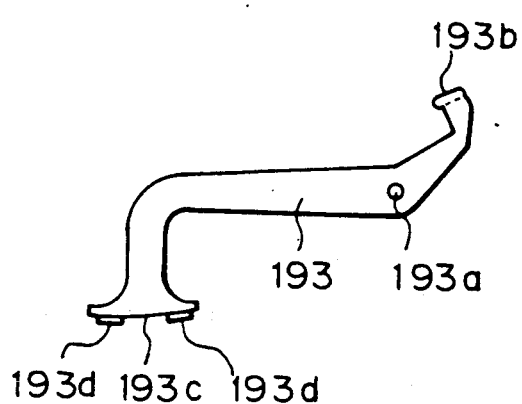

MULTIPLE DISC PLAYER WITH MECHANISM FOR CHANGING OF DISCS

BACKGROUND OF THE INVENTION

1. Field of the Invention:

The present invention relates to a disc player, and more particularly to a multiple-disc player which is capable of storing a plurality of discs and playing back any desired succession of discs selected from the stored discs.

2. Description of the Prior Art:

One conventional multiple-disc player is known from Japanese Laid-Open Patent Publication No. 61-261853, for example. The known multiple-disc player has a playback means including a turntable, a clamper, a pickup, etc., a disc holder insertably mounted in a player housing for storing an array of successive discs perpendicular to the disc carrying surface of the turntable, and a disc pickup/transfer mechanism for selecting desired discs, one at a time, from the disc holder, transferring the disc onto the disc carrying surface of the turntable, and returning the disc from the disc carrying surface back into the disc holder.

For transferring a selected disc from the disc holder onto the turntable, the disc pickup/transfer mechanism moves the disc in two directions, i.e., a first direction parallel to the disc carrying surface of the turntable and a second direction normal to the first direction, i.e., the direction in which the discs are arrayed in the disc holder. More specifically, either one of the playback means and the disc holder is carried on a carriage which is reciprocally moved in the direction of the array of the discs by a driver means to move the disc in that direction. The disc is also moved in the direction parallel to the disc carrying surface of the turntable as follows:

As shown in FIGS. 1 and 2 of the accompanying drawings, the disc holder is composed of a housing 1 in the form of a rectangular parallelepiped, and a plurality of flat trays 4 arrayed in the housing 1 in a direction (of the arrow Z and the direction opposite thereto) substantially normal to the disc carrying surface of the turntable, the trays 4 being rotatable about a support shaft 2 extending in the direction in which the trays 4 are arrayed. The trays 4 hold respectively discs 3 thereon in their major surfaces and are movable into and out of the housing 1 along their major surfaces. One of the discs 3 can be transferred in one direction (parallel to the disc carrying surface of the turntable) simply by taking the tray 4 holding that disc 3 out of the housing 1.

A pusher 6 is rotatably disposed laterally of the disc holder for engaging the trays 4 and pushing them out of the housing 1. A slider 7 is positioned near the disc holder for linear reciprocating movement. The slider 7 can be moved in an advancing direction by a certain driving force imparting means to enable a leading end 7a thereof to engage the pusher 6 for applying a moment to the pusher 6 thereby to turn the same.

More specifically, the overall playback means, together with the carriage carrying the playback means is reciprocably moved in the direction of the arrow Z and the direction opposite thereto for thereby relatively moving and positioning the trays 4 and the turntable in the direction in which the trays 4 are arrayed. The pusher 6 is turned to push one tray 4 out of the disc holder housing 1 for positioning the disc 3 in that tray on the turntable.

As illustrated in FIGS. 2 and 3, two projecting pins 6a are mounted on the pusher 6 and slidably engage respectively in two arcuate guide slots 8a, 8b defined in the carriage (not shown) to guide the pusher 6 for its turning movement. As shown in FIG. 2, the trays 4 are rotatable about an axis (which is the central axis of the support shaft 2) which is in alignment with the axis about which the pusher 6 is rotatable.

In the case of a vibration resistent player, the playback means is mounted on the support member by means of a vibration-resistant mechanism for protecting the playback means, which includes precision components such as the turntable and the pickup, from external vibrations. When the multiple-disc player is shipped from a factory of the manufacturer, it may be subjected to relatively large shocks which are large enough to move the playback means, supported on the not so rigid vibration-resistant mechanism, into abrupt collision with the player housing causing severe damages.

On the other hand, the trays 4 are in the form of thin plates. Consequently, when the tray 4 holding a disc 3 to be played back is pushed out of the housing 1, the tray 4 tends to be bent or flexed in a direction normal to the disc carrying surface of the turntable. If the tray 4 projecting out of the housing 1 is bent too much, the tray 4 would contact the playback means thereby damaging the disc being played back.

SUMMARY OF THE INVENTION

In view of the aforesaid difficulties of the conventional multiple-disc players, it is an object of the present invention to provide a multiple-disc player which is highly resistant to vibration applied to a playback means in particular.

According to the present invention, a support member on which a playback means including a turntable is mounted by a vibration-resistant mechanism is movable from an unretracted position to a retracted position with respect to a tray which is pushed out of a disc holder for a playback process. When the support member is in the unretracted position, the playback means is fixed with respect to a player housing by a lock mechanism.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 1 through 3 are views showing a part of a conventional multiple-disc player;

FIG. 4 is a perspective view of a multiple-disc player according to the present invention;

FIGS. 14 through 31 are views showing, in detail, various components of the internal structure of the multiple-disc player according to the invention;

DETAILED DESCRIPTION OF THE PREFERRED EMBODIMENT

A multiple-disc player according to the present invention is generally indicated at 101 in FIGS. 4 through 7.

Figure 6:
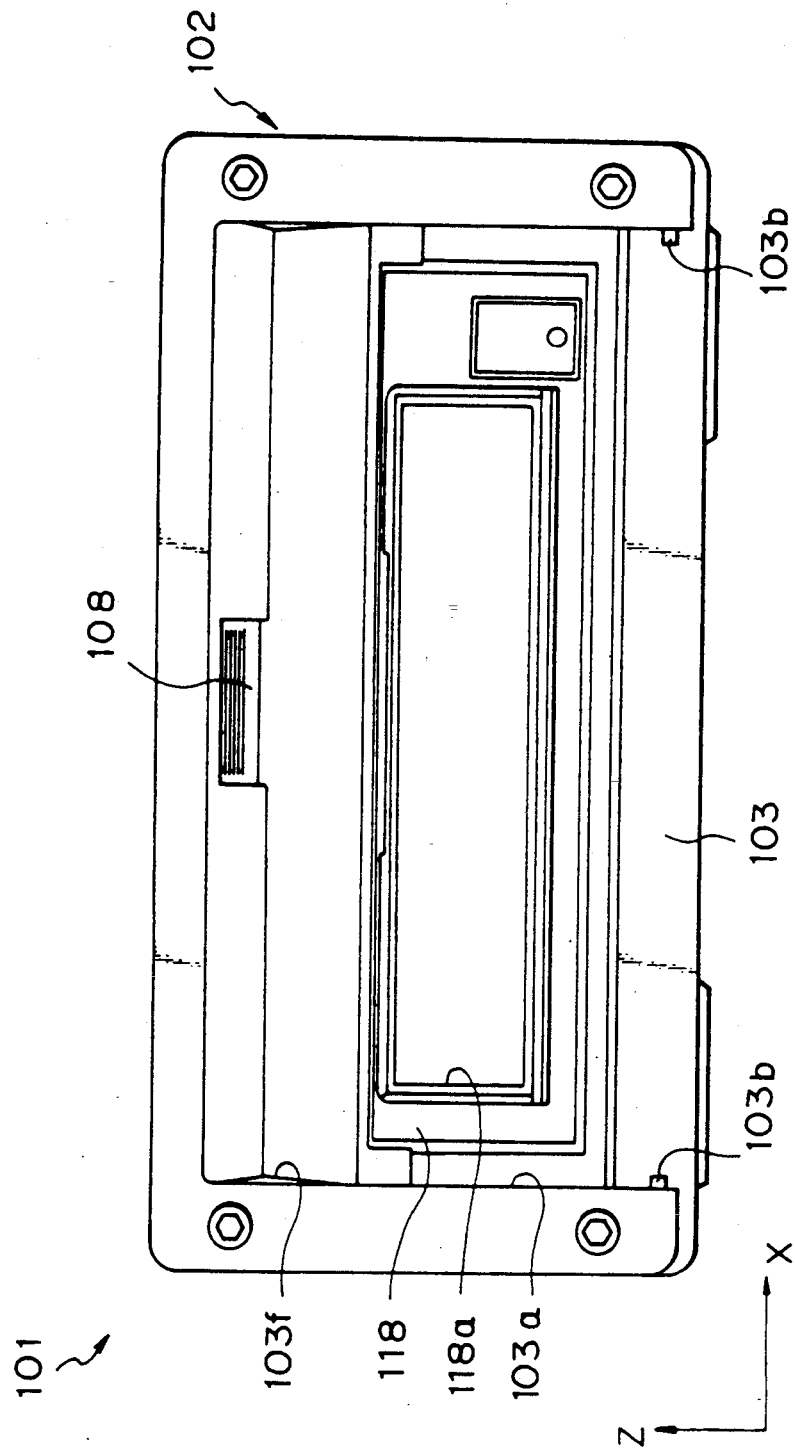
FIG. 6 is a front elevational view of the multiple-disc player of the invention.
Figure 7:
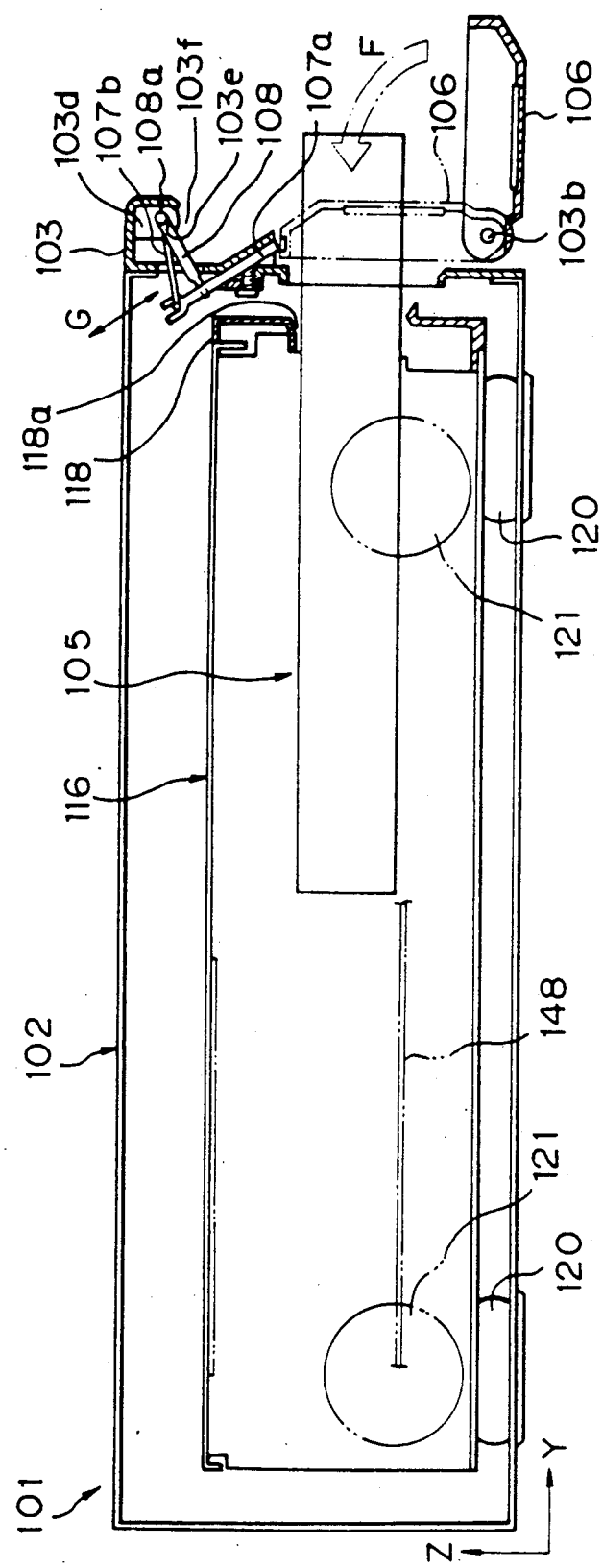
FIG. 7 is a side elevational view, partly in cross section, of an internal structure of the multiple-disc player of the present invention.

As shown in FIGS. 4, 6, and 7, the multiple-disc player includes a player housing 102 which is substantially in the form of a rectangular parallelepiped. The player housing 102 includes a front panel 103 having a rectangular slot 103a defined therein for loading a magazine or disc holder 105 into the player housing 2, the slot 103a extending parallel to the X-axis as shown. A lid 106 is pivotably mounted on the front panel 103 by means of pins 103b (see FIGS. 6 and 7) on the front panel 103, and is pivotably movable about a lower longitudinal edge of the lid 106. The slot 103a can be closed by the lid 106 when the lid 106 is turned about the pins 103b in the direction of the arrow F.

A lock means for locking the lid 106 in the closed position, and a release button for releasing the lid 106 from the closed position will be described below. As shown in FIG. 7, a finger 107a is mounted on the front panel 103 for engaging a free edge of the lid 106 to lock the lid in the closed position. The finger 107a is reciprocally movable in the directions of the arrow G between an engaging position and a releasing position. The finger 107a is shown as being in the engaging position in FIG. 7. The finger 107a is normally urged to move into the engaging position by a spring 107b. The finger 107a and the spring 107b jointly provide a lock means for locking the lid 106 in the closed position.

A release button 108 is disposed near the lock means for releasing the cover 106 from the engagement with the lock means. The release button 108 is pivotably mounted on the front panel 103 for movement between an operated position and an unoperated position. The release button 108 has a free end engaging the finger 107a. More specifically, the release button 108 has a projecting support shaft 108a about which the release button 108 is pivotable, the support shaft 108a pivotably disposed in a U-shaped bearing groove 103e defined in a rib 103d on the front panel 103. The bearing groove 103e has its depth-wise direction extending substantially perpendicularly to the directions in which the finger 107a is reciprocally movable. Thus, the support shaft 108a is prevented by the finger 107a from being dislodged from the bearing groove 103e. By using the finger 107a also as a stop to keep the support shaft 108a in place, the number of parts required is reduced. The spring 107b also serves to urge the support shaft 108a into the bearing groove 103e for thereby preventing the support shaft 108a from wobbling in the bearing groove 103e.

The release button 108 is disposed in a cavity 103f defined on an outer side surface of the front panel 103 and extending in the direction of the arrow X and the direction opposite thereto in the vicinity of the lid 106. Therefore, the release button 108 is less likely to be touched by a human body or an object against the intention of the operator. The cavity 103f is disposed above the lid 106 so that the lid 106 which turns about its lower edge will not interfere with operation of the release button 108. The cavity 103f has a V-shaped cross section normal to the directions in which the cavity 103f extends (i.e., the direction of the arrow X and the direction opposite thereto). The release button 108 is located in an upper portion of the cavity 103f, i.e., on the upper side of the V shape. This arrangement allows the operator to have a finger touch the release button 108 from the upper side when the player is placed within a trunk room of an automobile. The force which is applied by the finger to operate the release button 108 is directed obliquely upwardly so that the release button 108 can be operated easily and effectively.

Figure 8:
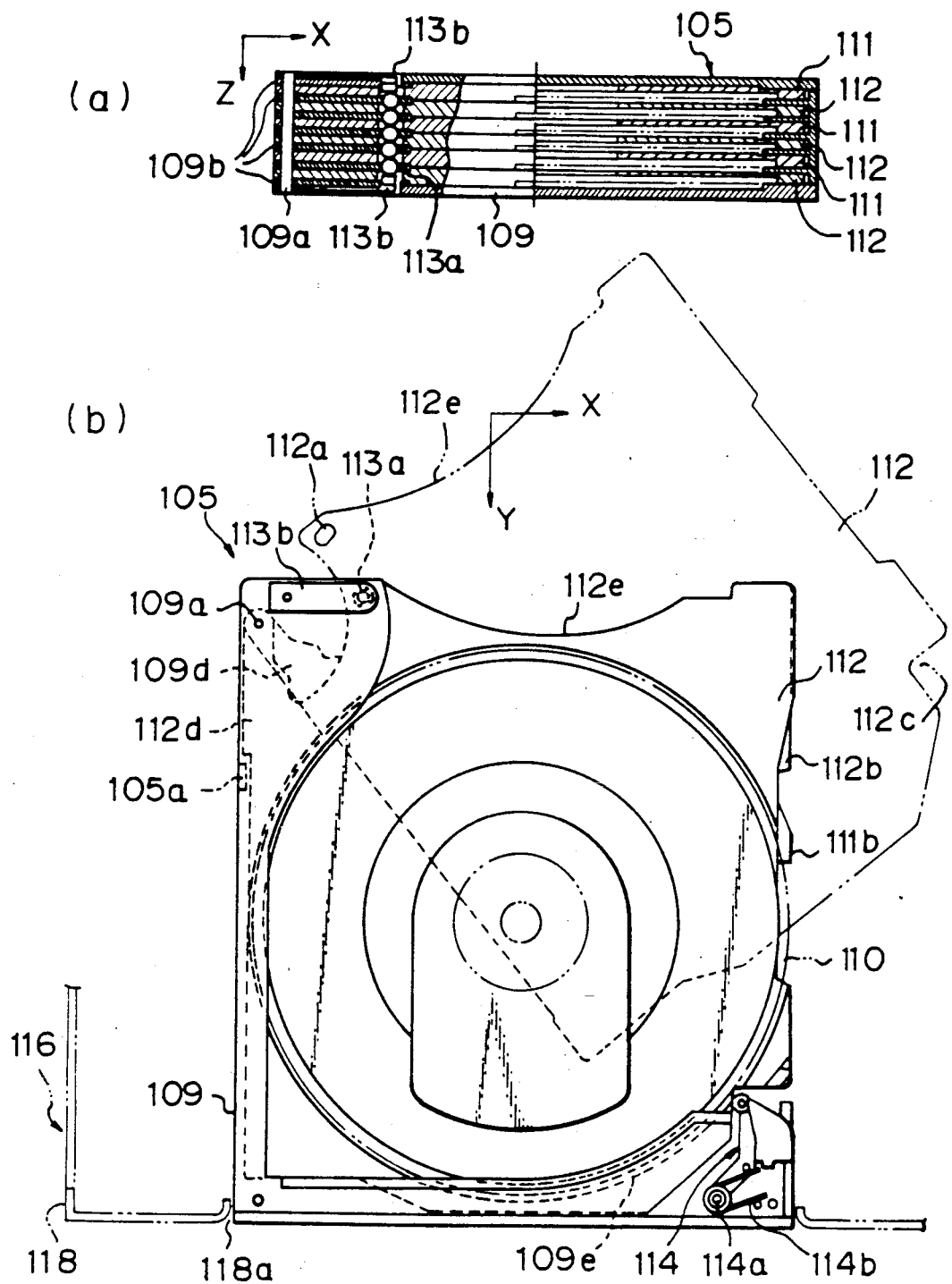
FIGS. 8 through 11 are views showing a magazine.

As illustrated in FIGS. 8(a) and 8(b), the magazine 105 has a magazine casing 109 in the form of a flat rectangular parallelepiped as a whole, and a total of six alternate rectangular plate-like trays A111 and B112, divided into two groups each containing three trays, for holding respective discs 110 in their major surfaces. The trays A111, B112, and hence the discs 110 are arrayed at a predetermined pitch in directions normal to the disc carrying surface of a turntable (described later on), i.e., in vertical directions (the direction of the arrow Z and the direction opposite thereto). The trays A111, B112 are rotatably supported on a support shaft 109a disposed at the righthand left end of the magazine casing 109 and extending vertically in the directions in which the trays are arrayed, so that the trays A111, B112 can move into and out of the magazine casing 109 along the respective major surfaces.

The construction of the magazine 105 will be described in greater detail.

Figure 9:
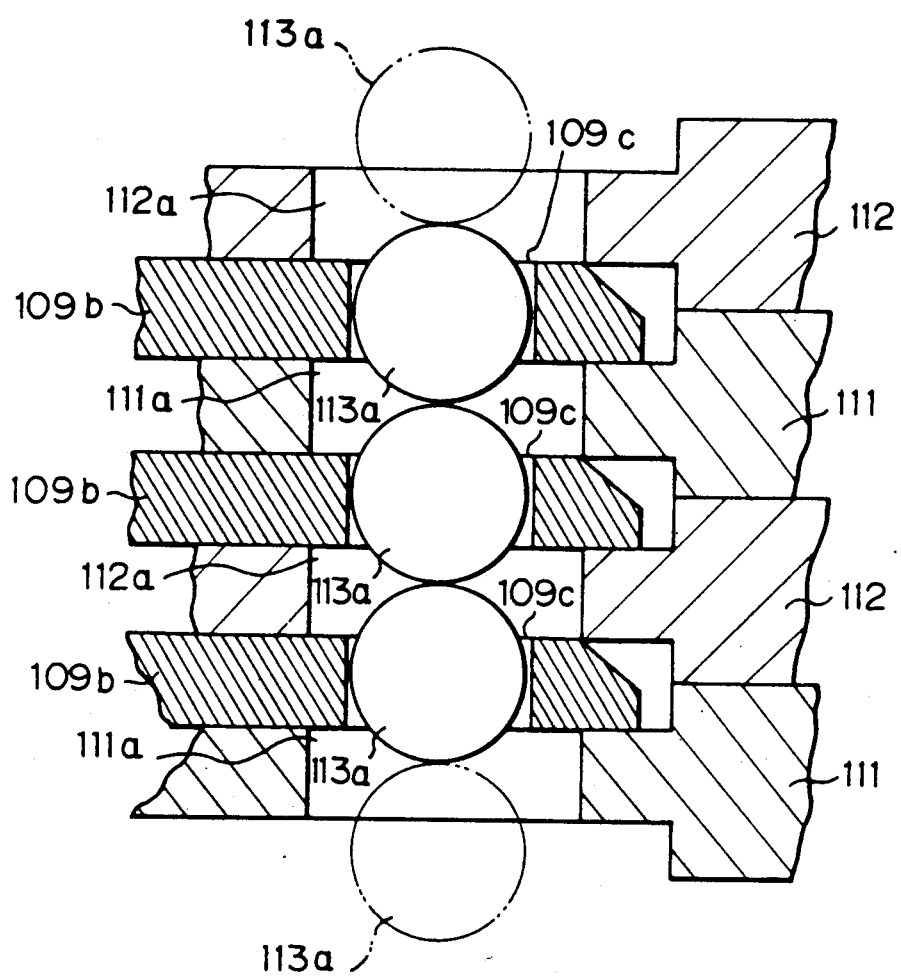
Figure 10:
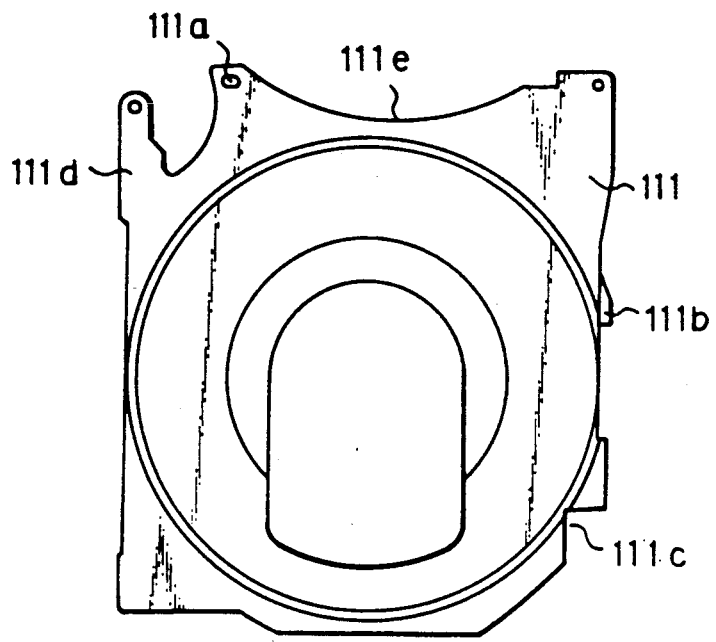
Figure 11:
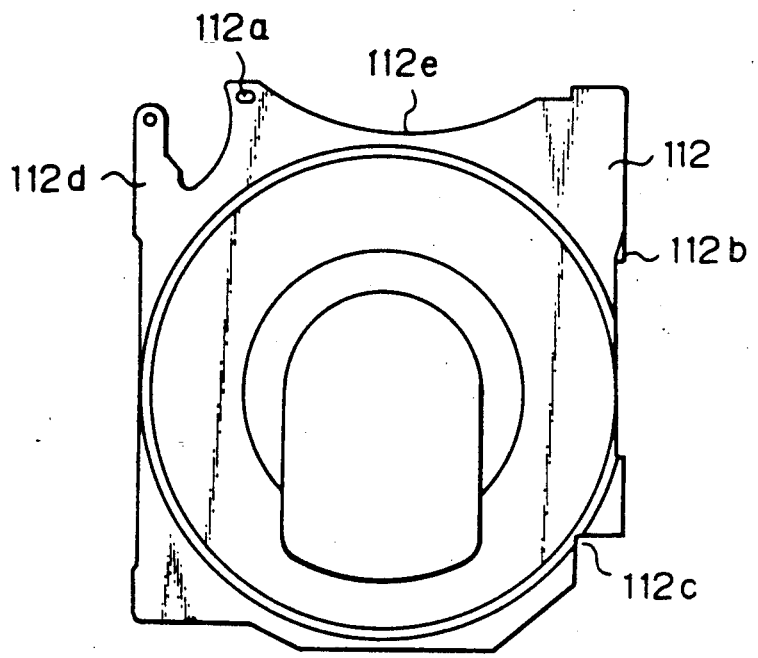

The magazine casing 109 has seven partitions 109b which are spaced vertically in the direction of the arrow Z and the direction opposite thereto. The trays A111, B112 are disposed between the partitions 109b. As clearly seen from FIG. 9, the partitions 109b have respective small circular concentric openings or holes 109c defined therein near the support shaft 109a. FIGS. 10 and 11 show the trays A111, B112 in detail. As also shown in FIGS. 10 and 11, the trays have holes or openings 111a, 112a which can be brought into registry with the openings 109c defined in the partitions 109b. In these openings 109c, 111a, 112a, there are fitted five spherical movable elements 113a which can move in the directions (the direction of the arrow Z and the direction opposite thereto) in which the partitions 109b are arrayed. The diameter of each of the spherical movable elements 113a is equal to the pitch at which the alternate trays 111, 112 are spaced. The spherical movable elements 113a are normally urged against each other by a pair of leaf springs 113b disposed on the upper and lower ends of the magazine casing 109.

As illustrated in FIG. 8(b), a presser lever 114 is disposed in the lefthand front end of the magazine casing 109 and extends substantially in the fore-and-aft directions (the direction of the arrow Y and the direction opposite thereto). The presser lever 114 has a front end pivotably attached to the magazine casing 109 by means of a pin 114a which extends vertically in the direction of the arrow Z and the direction opposite thereto. The other end, or rear end, of the presser lever 114 can smoothly engage the free ends of the trays 111, 112. A spring 114b engages the presser lever 114 for normally urging the presser lever 114 counterclockwise in FIG. 8(b) to enable the presser lever 114 to push the trays.

The presser lever 114 and the spring 114b jointly serve as a presser means for pressing the trays 111, 112 into a storage position in the magazine casing 109 and toward the support shaft 109a. The presser means, the openings 109c defined in the partitions of the magazine casing 109, the openings 111a, 112a defined in the trays 111, 112, the spherical movable elements 113a, and the leaf springs 113b jointly constitute a click mechanism for locking the trays 111, 112 in the storage position in the magazine casing 109.

As illustrated in FIGS. 10 and 11, the trays 111, 112 are of substantially the same shape except that they have respective ledges 111b, 112b of different shapes and in different positions, which can be engaged by a fingertip for pulling the trays out of the magazine casing 109. The trays 111, 112 have recesses 111c, 112c defined in their free ends and in which the presser lever 114 can engage.

Figure 1:
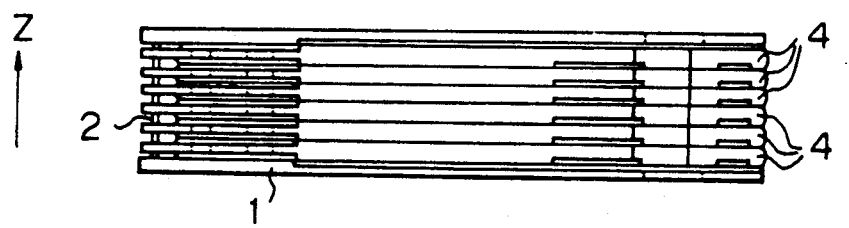
Figure 2:
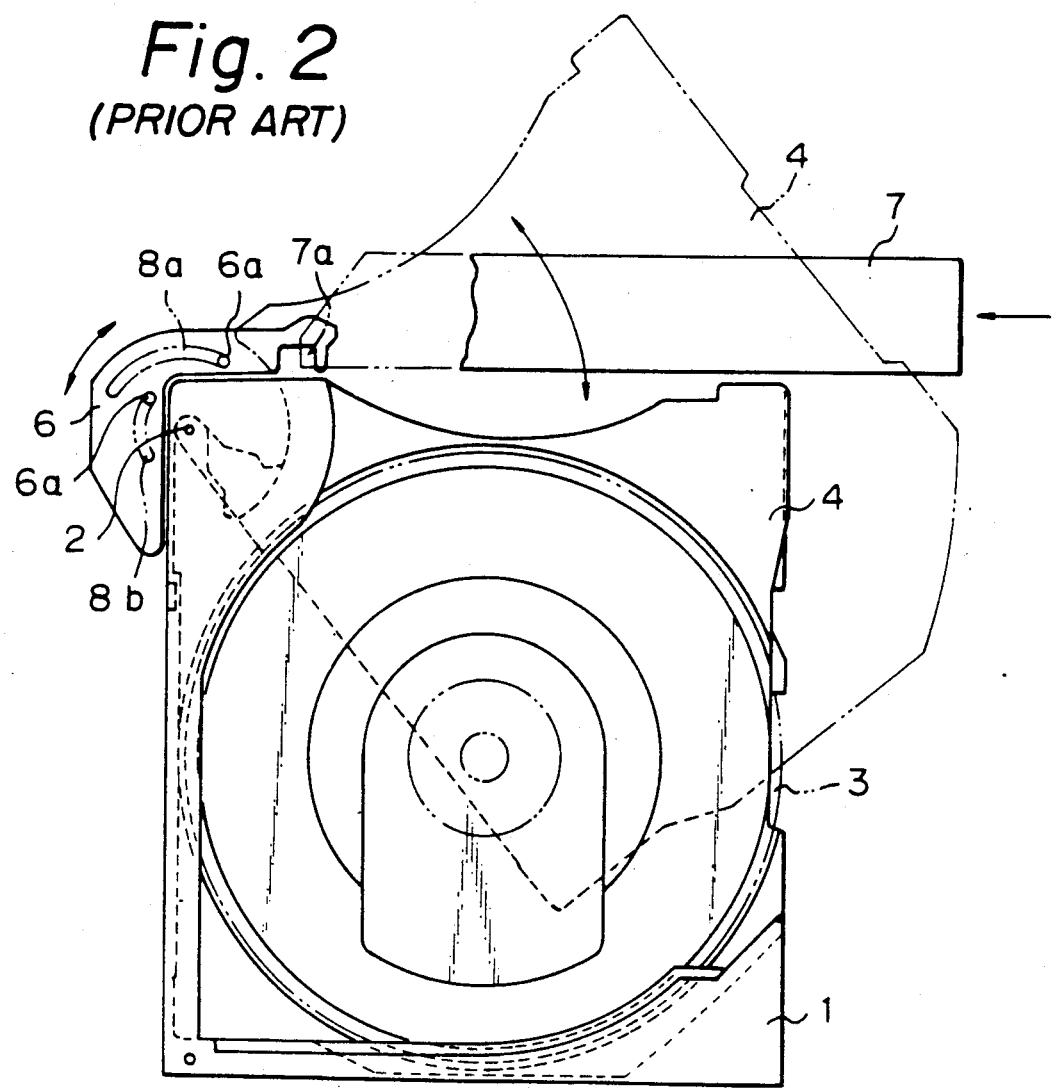
Figure 5:
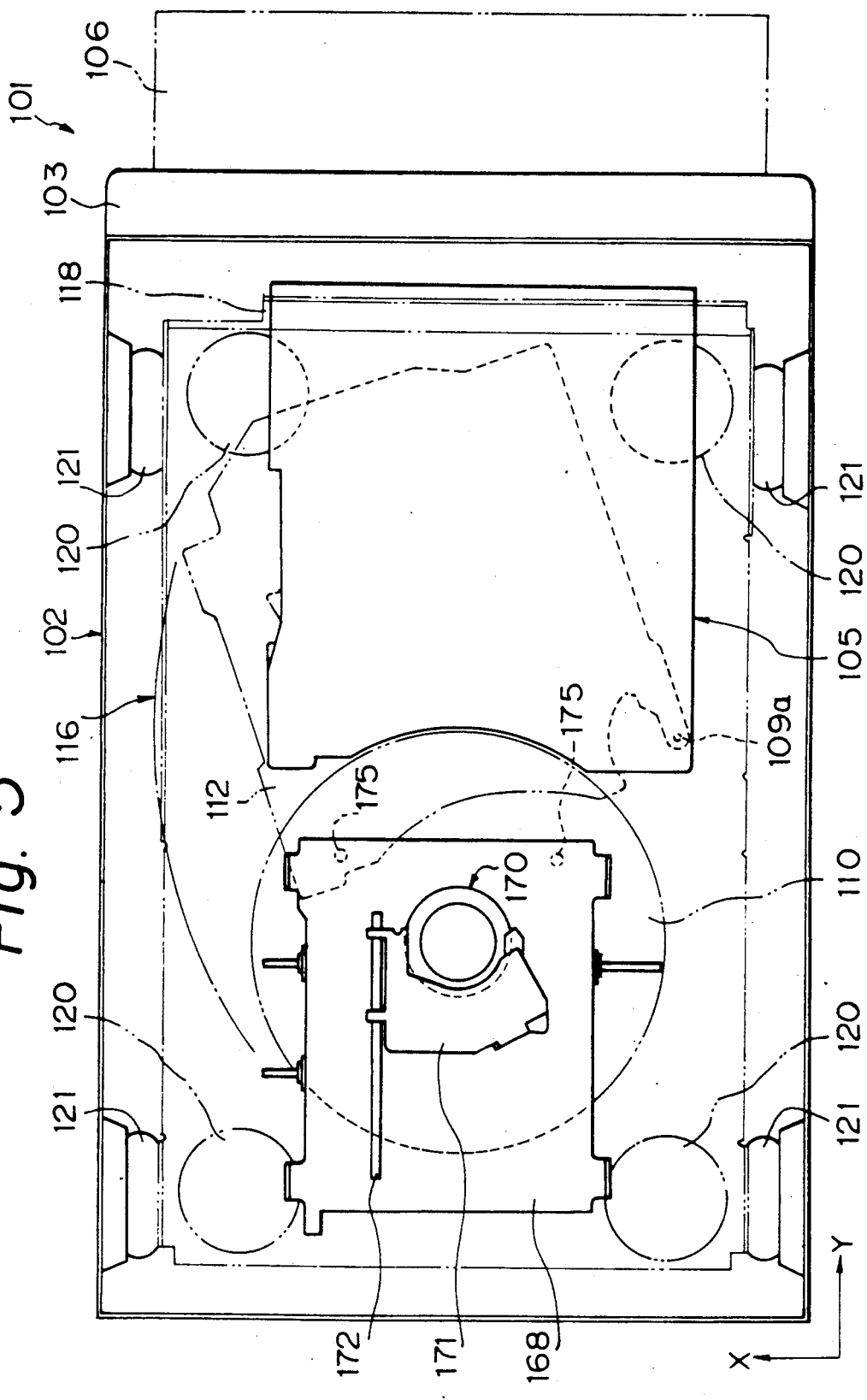
FIG. 5 is a plan view of an internal structure of the multiple-disc player of the invention.

As shown in FIGS. 4, 5, and 7, a chassis 116 serving as a support member is disposed in the player housing 102. As shown in FIG. 4, the chassis 116 is suspended in the player housing 102 by four coil springs, 117 serving as resilient members. As described hereinafter, a playback means and a disc transfer mechanism are mounted on the chassis 116. The chassis 116 is in the form of a rectangular parallelepiped having an open front end (in the direction of the arrow Y). As illustrated in FIGS. 4 through 7 and 8(b), a decorative panel 118 is attached to the front end of the chassis 116, and has a rectangular magazine insertion hole 118a for the insertion therethrough of the magazine 105 which has been placed through the slot 103a in the front panel 103. As shown in FIG. 8(b), the magazine 105 is completely loaded when it is fully inserted into the magazine insertion hole 118a.

Figure 13:
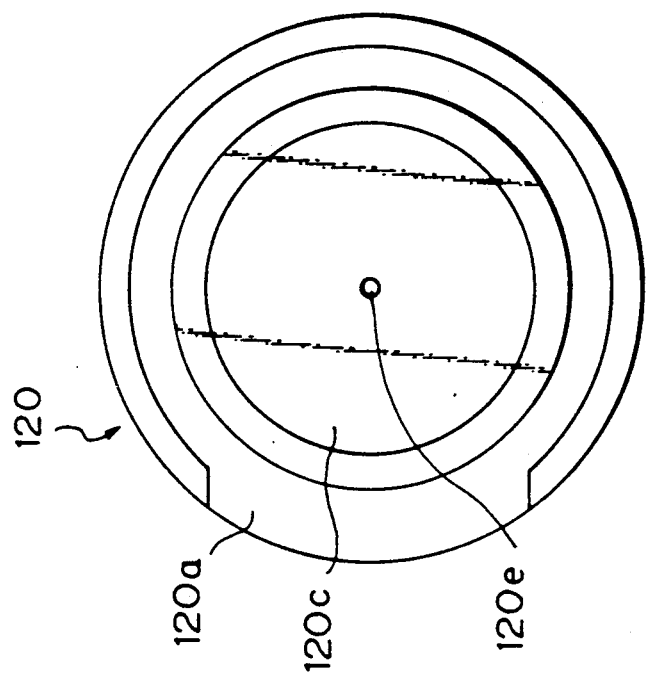
FIGS. 12 and 13 are views showing an air damper.
Figure 12:
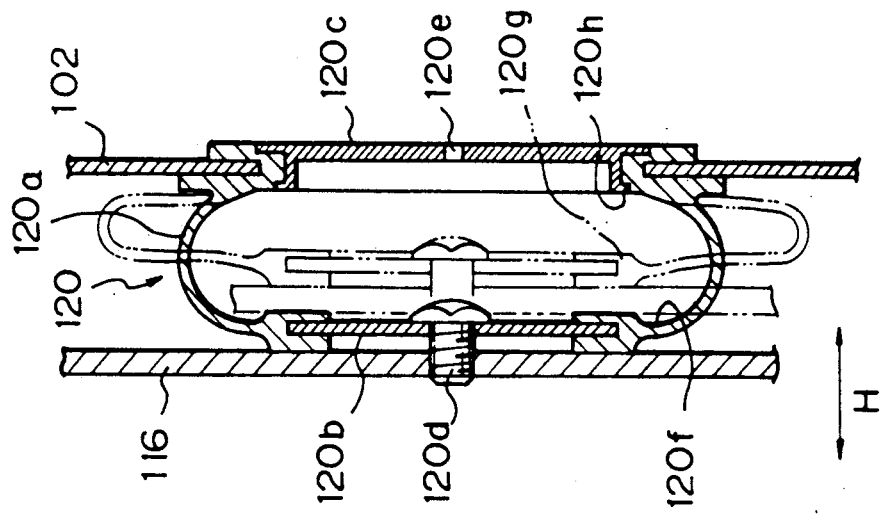

As shown in FIGS. 4, 5, and 7, four air dampers 120 are interposed between the lower end of the chassis 116 and the player housing 102, and four air dampers 121 are interposed between the lateral sides of the chassis 116 and the player housing 102, two air dampers 121 being on each side of the chassis 116. The air dampers 120 serve as first vibration-resistant members, whereas the air dampers 121 as second vibration-resistant members. The air dampers 120, 121 are identical in structure. As shown in FIGS. 12 and 13, each of the air dampers 120 comprises a flat viscoelastic hollow member 120a made of rubber or the like and having two confronting openings, and a pair of disc-shaped rigid members 120b, 120c closing the openings, respectively. One of the rigid members 120b comprises a steel plate fixed to the chassis 116 by means of a small screw 120d. The other rigid member 120c has a central air hole 120e through which air can be introduced into and discharged from the viscoelastic hollow member 120a.

The viscoelastic hollow member 120a has an annular recess 120f defined in its inner surface and extending around one of the openings in which the rigid member 120b is fitted. When the disc player is subjected to external vibration, the viscoelastic hollow member 120a is elastically deformed as indicated by the two-dot-and-dash lines in FIG. 12 as the chassis 123 moves in the direction of the arrow H, forcing air to flow into and out of the viscoelastic hollow member 120a through the air hole 120e, so that the vibratory energy of normal magnitude can be absorbed. If the vibratory energy applied is increased to a considerable extent, a peripheral edge 120g of the opening in which the rigid member 120b is fitted is forced to collide with an inner side surface 120h of the confronting rigid member 120c, for thereby absorbing the vibratory shock in a rather abrupt fashion. The annular recess 120f allows the peripheral edge 120g to bump the confronting surface smoothly and effectively. The vibration absorbing effect of the air dampers 120, 121 will later be described in more detail.

As shown in FIGS. 14 through 17, a carriage 123 is disposed on a front half portion of the chassis 126 for caring the magazine 105 which has been inserted into the player housing 102. The carriage 116 is mounted on the chassis 116 so as to be movable vertically in the directions in which the trays 111, 112 are arrayed in the magazine 105 (the direction of the arrow Z and the direction opposite thereto). The carriage 123 is substantially of a rectangular parallelepiped having open front and rear ends to allow the magazine 105 to be inserted into the carriage 123.

Figure 14:
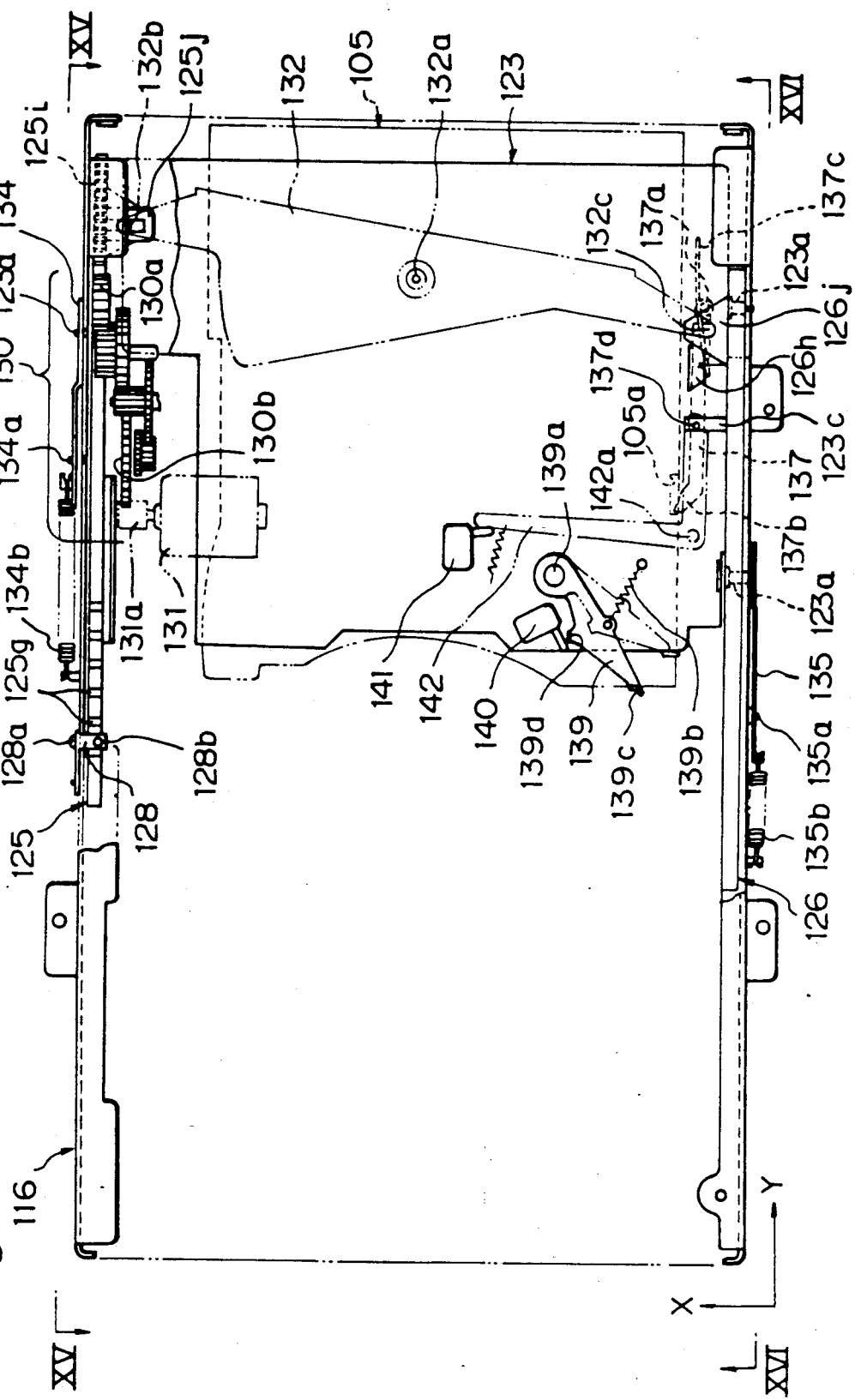
Figure 18:
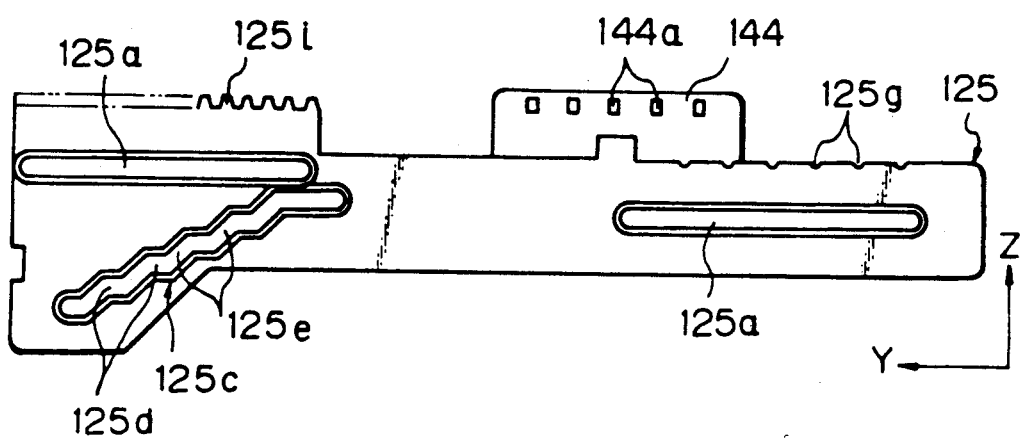
Figure 19:
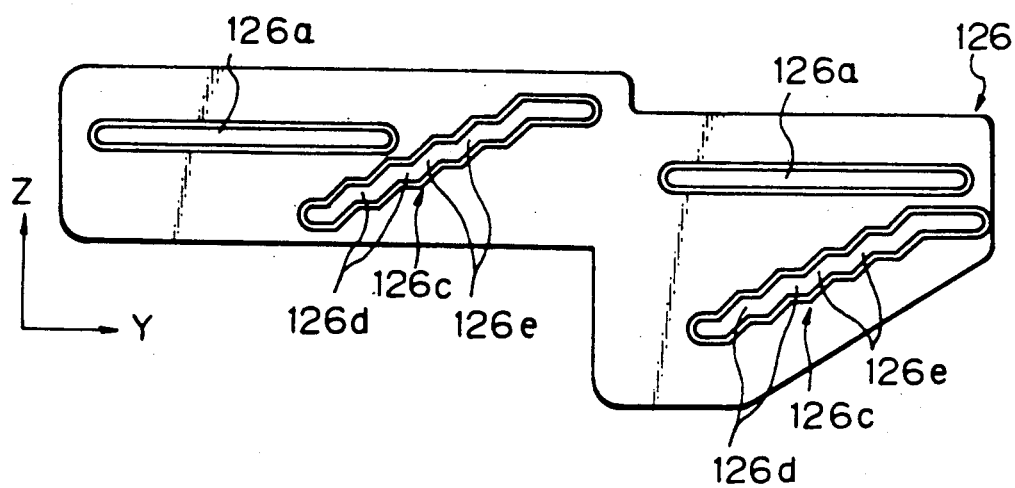

As illustrated in FIGS. 14 through 16, a pair of longitudinally movable plates 125, 126 serving as movable members is disposed in the chassis 116 and extend parallel to each other along the fore-and-aft directions in sandwiching relation to the carriage 23 in the lateral directions. FIGS. 18 and 19 show the movable plates 125, 126. The movable plates 125, 126 have guide grooves 125a, 126a defined respectively therein and extending longitudinally of the movable plates 125, 126. The movable plates 125, 126 are attached to the chassis 116 for reciprocating movement in the fore-and-aft directions, by pins 116a projecting from the chassis 116 and slidably fitted in the respective guide grooves 125a, 126a.

The carriage 123 sandwiched between the movable plates 125, 126 has three projecting pins 123a, one on the lefthand side thereof and two on the righthand side thereof. As shown in FIGS. 15 and 16, these pins 123a are slidably fitted in respective guide grooves 116b defined vertically in the chassis 116 (in the direction of the arrow Z and the direction opposite thereto) for vertically guiding the carriage 123. The pins 123a on the carriage 123 slidably extend through the guide grooves 116b in the chassis 116 and also cam grooves 125c, 126c defined in the movable plates 125, 126. The cam groove 125c defined in the lefthand movable plate 125 is inclined as a whole downwardly (in the direction opposite to the direction of the arrow Z) in the forward direction (indicated by the arrow Y). The paired cam grooves 126c defined in the righthand movable plate 126 are inclined as a whole upwardly in the forward direction. Thus, the cam grooves 125c, 126c are shaped to allow the carriage 123 to be moved vertically in response to relative reciprocating movement of the movable plates 125, 126.

The cam grooves 125c, 126c have six straight portions 125d, 126d, respectively, extending in the directions (fore-and-aft directions) in which the movable plates 125, 126 are movable, and five inclined portions 125e, 126e contiguous to the straight portions 125d. 126d and slanted with respect to the straight portions 125d, 126d. Therefore, the cam grooves 125c, 126d are shaped like staircases as a whole. As shown in FIGS. 14, 15, and 18, the movable plate 125 disposed leftwardly of the carriage 123 has six recesses 125g defined as engaging portions in an upper edge thereof at equal pitches corresponding to the respective straight portions 125d. As illustrated in FIGS. 14 and 15, a pin 128b made of resin is disposed on a free end of a leaf spring 128 fixed as a resilient member to the lefthand outside surface of the chassis 116 by a screw 128a, and can engage one, at a time, of the recesses 125g under the resiliency of the leaf spring 128. The leaf spring 128 urges the cam surface of the cam groove 125c defined in the movable plate 125 to be pressed against the pin 123a of the carriage 123 for preventing the carriage 123 from wobbling due to the dimensional tolerances of the cam groove 125c and the pin 123a even if external vibration is applied to the disc player. The movable plate 125 is precisely held in a selected one of vertical positions since the pin 128b on the free end of the spring 128 engages a corresponding one of the six recesses 125g in the movable plate 125 under the resilient force of the leaf spring 128.

As illustrated in FIGS. 14, 15, and 18, the movable plate 125 on the lefthand side of the carriage 123 has a rack 125i on its front end, the rack 125i extending in the direction in which the movable plate 125 is movable. The rack 125i is held in mesh with a final gear 130a of a speed reducer mechanism 130. The speed reducer mechanism 130 includes a first gear 130b meshing with a small gear 131a fitted over the output shaft of a motor 131. When the motor 131 is energized to rotate the output shaft in one direction or the other, the movable plate 125 is reciprocally moved. As shown in FIG. 14, a turn lever 132 is disposed between the movable plates 125, 126 and angularly movably supported at its center on the chassis 126 by a support shaft 132a extending vertically (in the direction of the arrow Z and the direction opposite thereto). The turn lever 132 has on its opposite ends respective projecting pins 132b, 132c movably mounted on respective arms 125j, 126j on the movable plates 125, 126 for smooth pivotal movement. When the motor 131 is energized, the movable plates 125, 126 are moved relatively to each other for vertically moving the carriage 123.

The motor 131, the speed reducer mechanism 130, the turn lever 132, and small parts associated therewith jointly constitute a driving force imparting means for applying a driving force to the movable plates 125, 126 to move these movable plates 125, 126.

As shown in FIGS. 14 through 16, swing levers 134, 135 are pivotably mounted on the lateral outer sides of the chassis 116 by means of respective pins 134a, 135b. The swing levers have free ends pivotally coupled to respective two of the pins 123a on the carriage 123. To these swing levers 134, 135, there are coupled respective coil springs 134b, 135b for normally biasing the pins 123a and hence the carriage 123 upwardly in the direction of the arrow Z. Therefore, when the motor 131 is rotated in a direction to move the carriage 123 upwardly against gravity, the ascending movement of the carriage 123 is assisted by the resilient forces of the coil spring 134b, 135b which are applied through the swing levers 134, 135.

Figure 17:
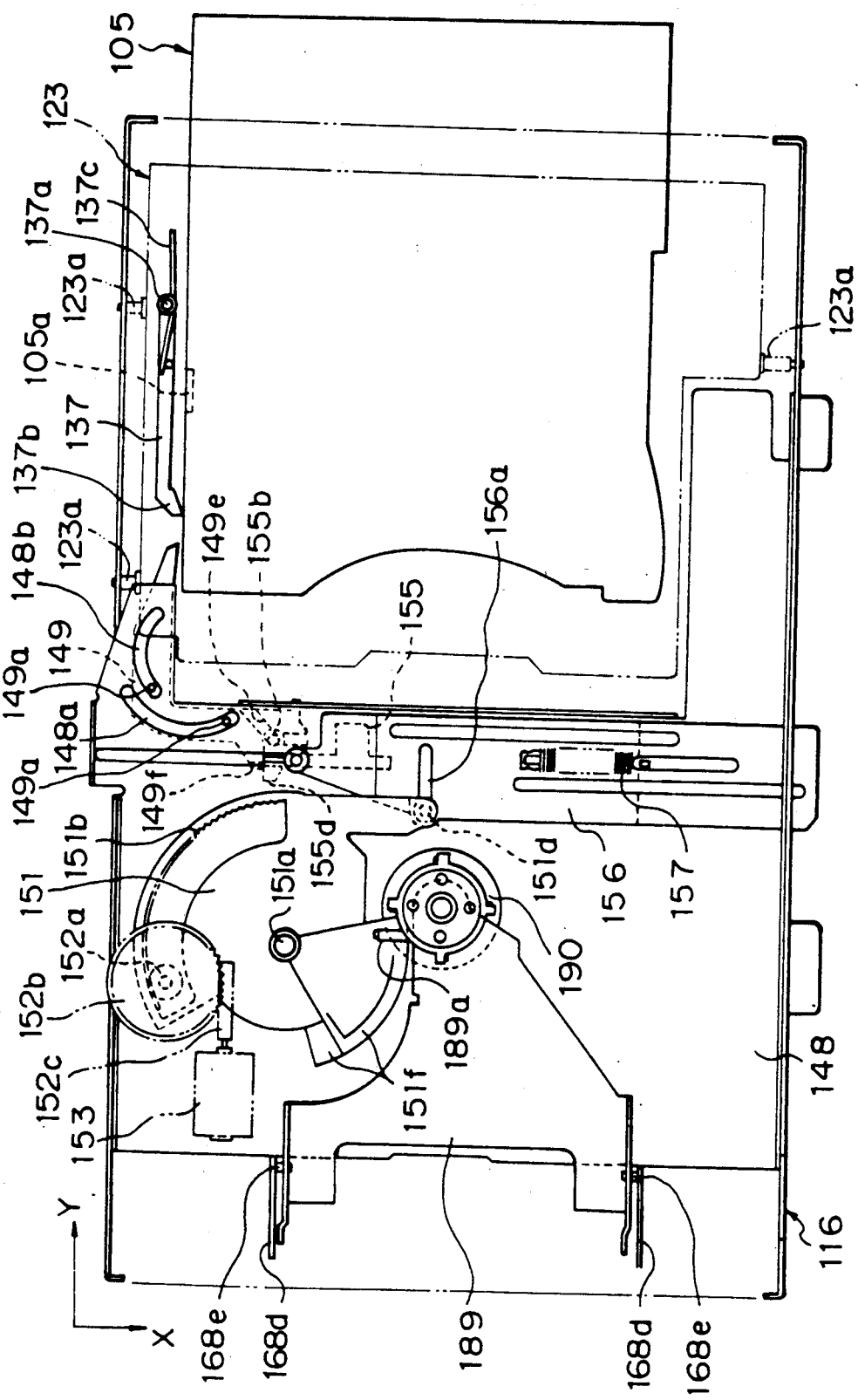

Now, a means for locking the magazine 105 inserted into the player housing 102, in the loaded position will be described hereinafter. As shown in FIGS. 8(b), 14, and 17, the magazine 105 has a recess 105a of a rectangular cross-sectional shape defined in the righthand side surface thereof. The carriage 123 has a lock member 137 disposed therein for engaging in the recess 105a to lock the magazine 105 in the loaded position. The lock member 137 is pivotably attached to the carriage 123 by means of a vertically extending support shaft 137a, and has a finger 137b on its free end for engaging in the recess 105a. A spring 137c is mounted on the support shaft 137a for normally urging the lock member 137 in a direction to engage in the recess 105a. As shown in FIG. 14, an upwardly extending pin 137d disposed on the lock member 137 projects through a small opening 123c defined in the upper panel of the carriage 123 into a position above the carriage 123. A tapered portion 126h on the movable plate 126 disposed rightwardly of the carriage 123 can engage the pin 137d. More specifically, when the movable plate 126 is moved backwards (in the direction opposite to the direction of the arrow Z) a predetermined distance, the tapered portion 126h engages the pin 137d to displace the lock member 127 out of the recess 105a of the magazine 105. Although not shown, there is provided a magazine ejecting means for ejecting the magazine 105 as it is unlocked from the lock member 137 from the player housing 102 by a certain distance under the resilient force of a spring to allow the disc player operator to retrieve the magazine 105.

A loading detector means for detecting when the magazine 105 inserted into the player housing 102 is loaded in its storage area will be described below. As shown in FIG. 14, a detector lever 139 is swingably mounted by a support shaft 139a at the righthand end portion of the carriage 123 holding the inserted magazine 105, i.e., at the deepest portion of the storage area. The detector lever 139 is normally biased by a coil spring 139b. The detector lever 129 has on its free end an abutment 139c which can be engaged by the leading end of the magazine 105 as it is inserted. A detector switch 140 is disposed on the carriage 123 on the lefthand side of the detector lever 139 and has an actuating arm which can be engaged by a raised portion 139d on the detector lever 139. The carriage 123 also supports thereon another detector switch 141 disposed in front of the detector switch 140. The detector switch 141 is triggered when one end of an L-shaped detector lever 142 swingably attached to the carriage 123 by a support shaft 142a engages the actuating arm of the detector switch 141. The other end of the detector lever 142 is pivotally mounted on the pin 137d on the lock member 137. When the lock member 137 locks the magazine 105 in position, the detector lever 142 engages the detector switch 141. The detector switch 141 serves as a first detector switch, and the detector switch 140 as a second detector switch. When the magazine 105 is completely loaded, the magazine loaded condition is reliably detected by these first and second detector switches. Only when the magazine loaded condition is detected, a disc loading process and a disc playback process are started in response to a playback command signal. When the magazine loaded condition is not detected, a disc loading process and a disc playback process are not initiated even if a playback command signal is applied.

The detector switches 140, 141 and the detector levers 139, 142 jointly serve as a loading detector means for detecting when the magazine 105 is loaded into its storage area.

As illustrated in FIGS. 15 and 18, an address plate 144 is integrally formed on a central upper edge of the movable plate 125, the address plate 144 having a plurality of, e.g., five slits 144a defined in line along the direction in which the movable plate 125 is movable. As shown in FIG. 15, a photosensor 145 is provided in alignment with the array of slits 144a for detecting the slits 144a. A slit detecting signal produced from the photosensor 145 is sent to a counter (not shown) which counts such slit detecting signals. A control unit (not shown) for automatically controlling the multiple-disc player determines the position where the movable plate 125 is stopped from the count of the counter.

Figure 20C:
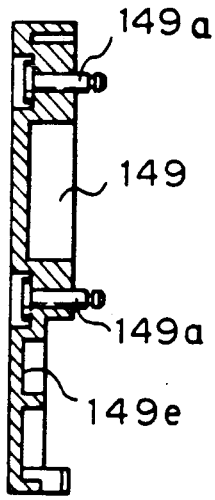
Figure 20A:
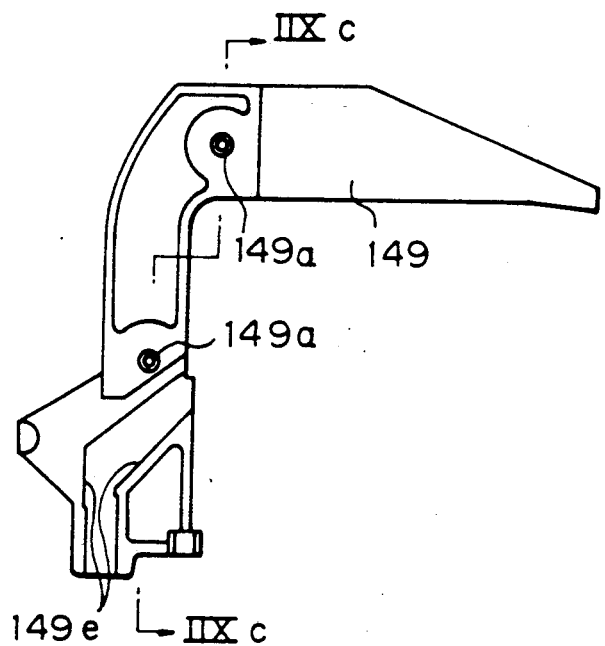
Figure 20B:
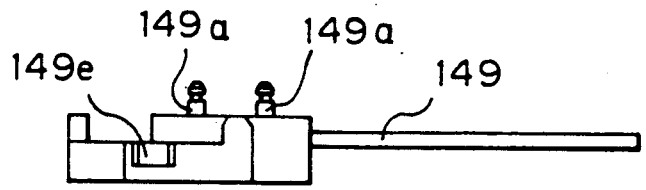

FIG. 17 shows the bottom of the internal structure of the multiple-disc player. As shown in FIG. 17, a sub-chassis 148 is fixed to a rear half portion of the chassis 116. A pusher 149 is disposed on the righthand front end of the subchassis 148 for engaging one, at a time, of the trays 111, 112 in the magazine 105 to push the tray out of the magazine 105. The pusher 149 is illustrated in FIGS. 20(a) through 20(c) in greater detail. As can be seen from FIGS. 20(a) through 20(c), the pusher 149 is substantially L-shaped as a whole and has a pair of pins 149a which slidably engages in respective arcuate guide grooves 148a, 148b (see FIG. 17) defined in the subchassis 148 for guiding the pusher 149, the guide grooves 148a, 148b having different radii of curvature. More specifically, the pusher 149 rotates about the axis aligned with the center of curvature of the arcuate guide grooves 148a, 148b to enable a finger 149c on one end thereof to push one, at a time, of the trays 111, 112 out of the magazine 105. The axis about which the pusher 149 is rotatable, i.e., the center of curvature of the arcuate guide grooves 148a, 148b is aligned with the axis about which the trays 111, 112 are rotatable, i.e., the support shaft 109a shown in FIG. 8(b). Each of the trays 111, 112 can be pushed out of the magazine 105 by the pusher 149 engaging a portion 111d, 112d (see FIGS. 8(b), 10, and 11) of the tray near the support shaft 109a.

Figure 21C:
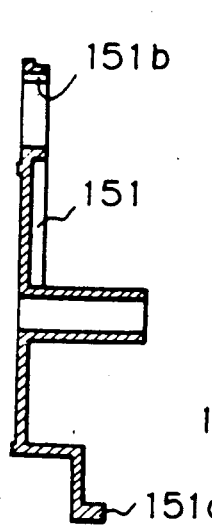
Figure 21A:
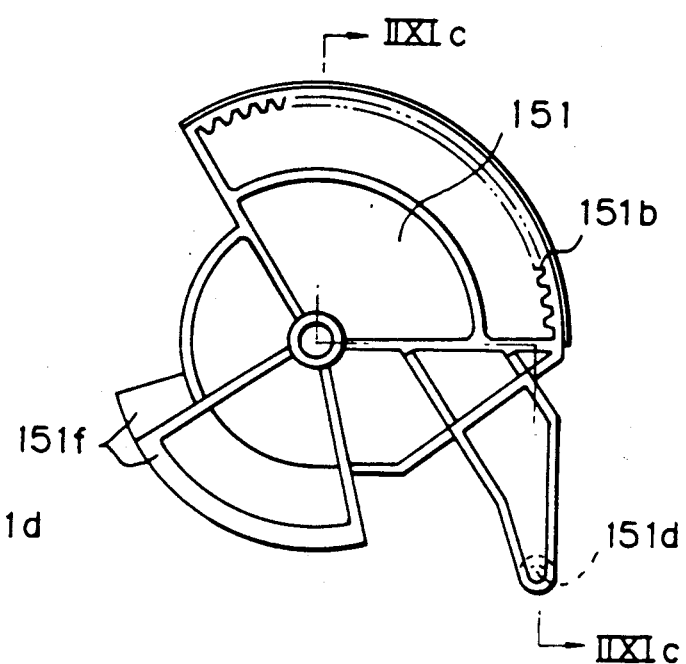
Figure 21B:
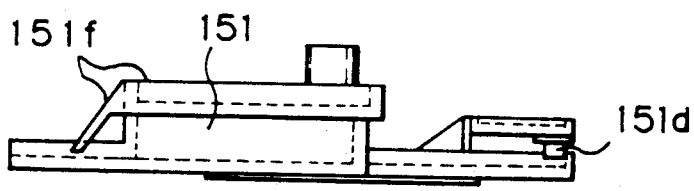

As shown in FIG. 17, a substantially disc-shaped intermediate lever 151 is rotatably mounted on the subchassis 148 behind the pusher 149 by means of a pin 151a. The intermediate lever 151 is shown in FIGS. 21(a) through 21(c) in more detail. The intermediate lever 151 has an internal gear 151b meshing with a gear 152a integral with worm wheel 152b held in mesh with a worm 152c mounted on the output shaft of a motor 153. Therefore, the intermediate lever 151 is rotated by the motor 153 through the train of these gears.

Figure 23C:
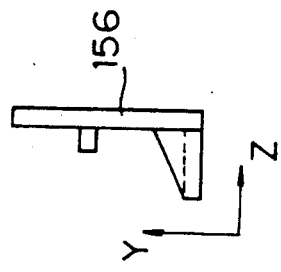
Figure 23A:
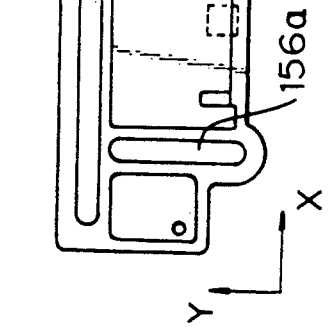
Figure 23B:
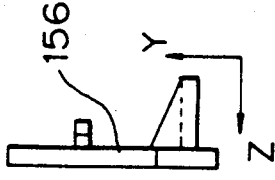

A slider 155 and a lever 156 which extend in the lateral directions are disposed on the righthand front end of the subchassis 148 in vertically overlapped relation. The slider 155 and the lever 156 are movably mounted on the subchassis 148 by means of a plurality of pins (not shown) for reciprocating movement in their longitudinal directions or lateral directions (the direction of the arrow X and the direction opposite thereto). FIGS. 22(a) through 22(c) show the slider 155 in detail, whereas FIGS. 23(a) through 23(c) illustrate the lever 156 in detail. As shown in FIGS. 17 and 21, the intermediate lever 151 has a projecting pin 151d on one end which is slidably fitted in an oblong hole 156a defined in the righthand end of the lever 156 and extending in the fore-and-aft directions (the direction of the arrow Y and the direction opposite thereto). When the motor 153 is rotated in one direction or the other to turn the intermediate lever 151 in one direction or the other, the lever 156 is moved to the left or right (the direction of the arrow X or the direction opposite thereto).

The slider 155 has one end in its direction of reciprocating movement, i.e., a righthand end (in the direction opposite to the direction of the arrow X) thereof serving to engage the pusher 149 to rotate the same. The lever 156 superposed on the slider 155 converts a rotative force of the intermediate lever 151 into a linear force which is applied to the slider 155.

Although not shown, a lock/unlock means is disposed between the slider 155 and the lever 156 for locking the slider 155 and the lever 156 with respect to each other, and also for unlocking them from each other when the slider 155 and the lever 156 as they are locked are moved in the forward direction to the right (in the direction opposite to the direction of the arrow X) until the slider 155 reaches its most advanced position in the forward direction (i.e., the position in which the pusher 149 turned by the slider 155 pushes one of the trays 111, 112 fully out of the magazine 105). The coil spring 157 shown in FIG. 17 serves as part of the lock/unlock means. The details of the lock/unlock means is disclosed in Japanese Patent Publication No. 61-261853, for example, and will not be described here in detail.

Figure 24:
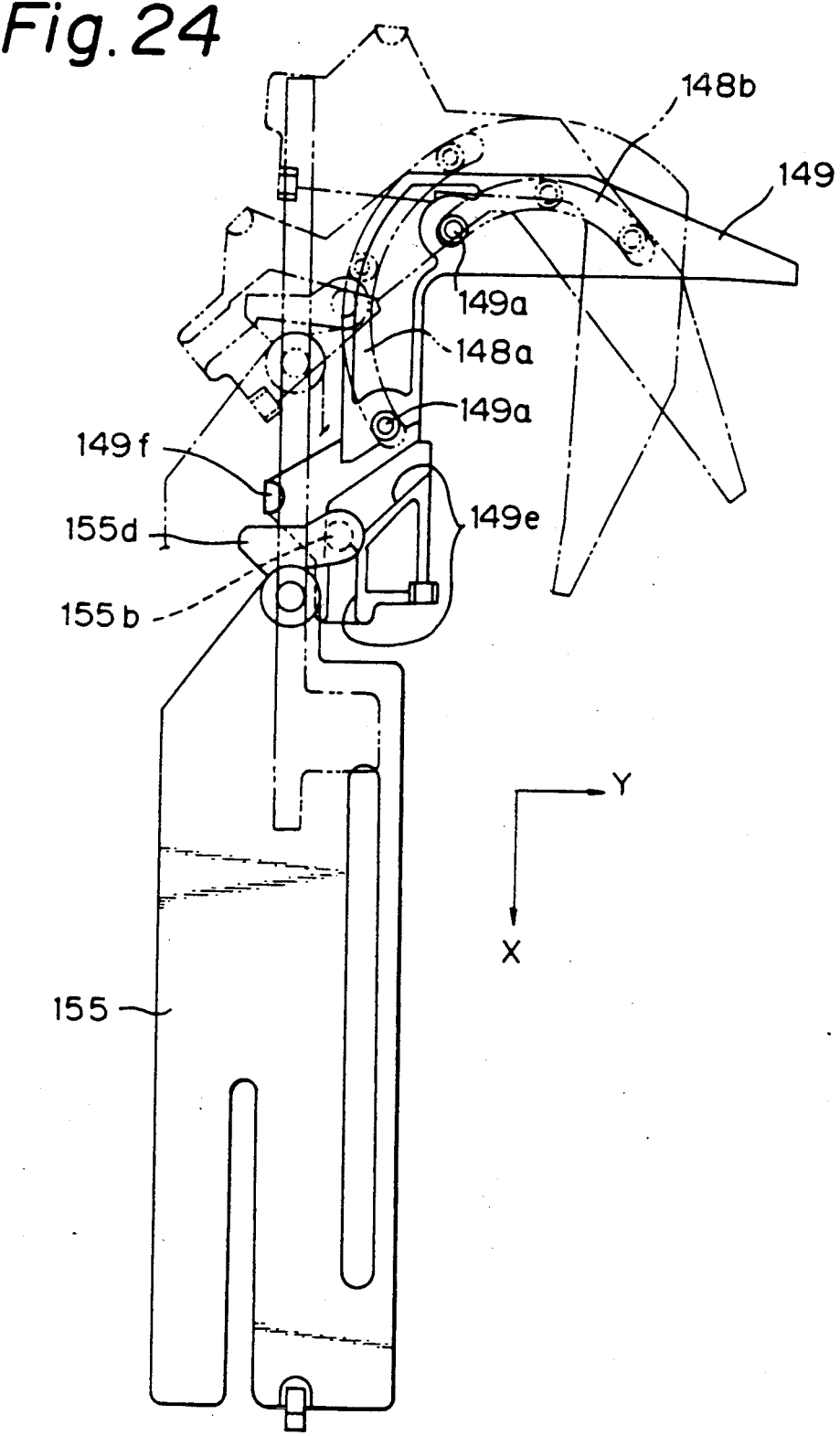

The manner in which the slider 155 engages the pusher 149 will be described below in detail. As shown in FIGS. 17, 20, and 24, the pusher 149 has an angular groove 149e defined in an end thereof, and a projecting pin 155b disposed on a leading end of the slider 155 in the forward direction of its movement slidably engages in the angular groove 149e. As shown in FIG. 24, movement of the slider 155 in the forward direction (the direction opposite to the direction of the arrow X) causes the pin 155b of the slider 155 to engage the bent portion of the angular groove 149e for thereby enabling the pusher 149 to start being angularly moved. The pusher 149 has a projection 149f extending radially outwardly of the angular groove 149e with respect to the center of rotation of the pusher 149. The slider 155 has an arm 155d disposed on its leading end in the forward direction of its movement for engaging the projection 149f. The arm 155d engages the projection 149f only during a small period immediately after the slider 155 starts moving in the forward direction, i.e., during an initial period of tray pushing stroke. However, this engagement between the arm 155d and the projection 149f applies a large moment to the pusher 149 regardless of the fact that a relatively small driving force is imposed on the slider 155. Therefore, the trays 111, 112 are easily released from the click mechanism (which comprises the spherical movable elements 113a and the leaf springs 113b shown in FIGS. 8 and 9) disposed in the magazine 105. After being released from the click mechanism, the pusher 149 is continuously turned by a small moment applied to the pusher 149 only by the engagement of the pin 155b of the slider 155 in the angular groove 149e in the pusher 149 for pushing one of the trays 111, 112 fully out of the magazine 105. Consequently, the motor 153 and a speed reducer mechanism which act as a driving force applying mechanism for applying a driving force to the slider 155 may be small in size, so that the entire disc player may be reduced in size and consume a reduced amount of electric power. The angular groove 149e is of such a bent configuration that the pusher 149 will reliably be returned to its starting position (shown in FIG. 17) by the pin 155b engaging in the angular groove 149e without any biasing forces from any spring when the slider 155 is moved back (in the direction of the arrow X).

Figure 25:
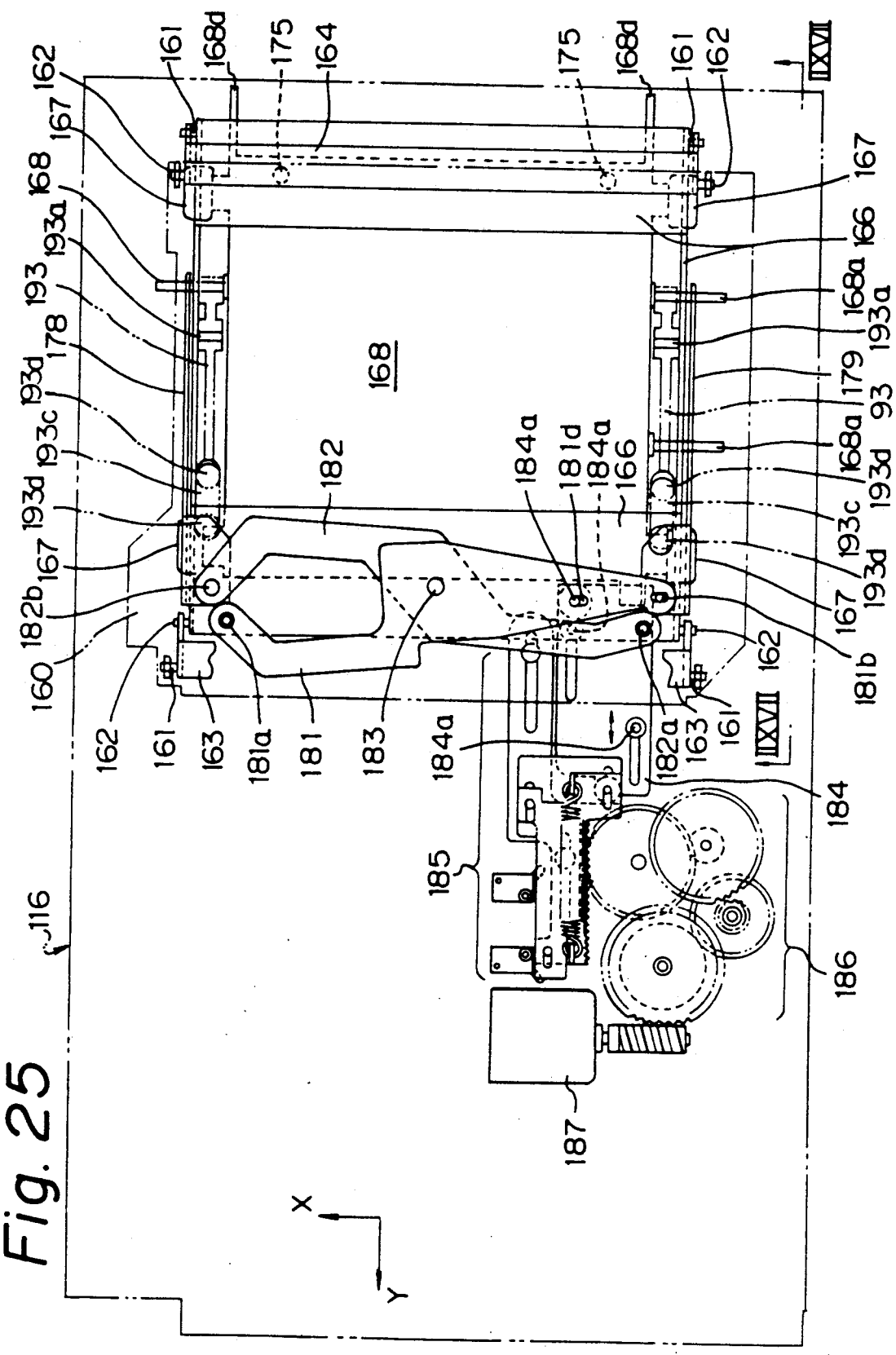
Figure 26:
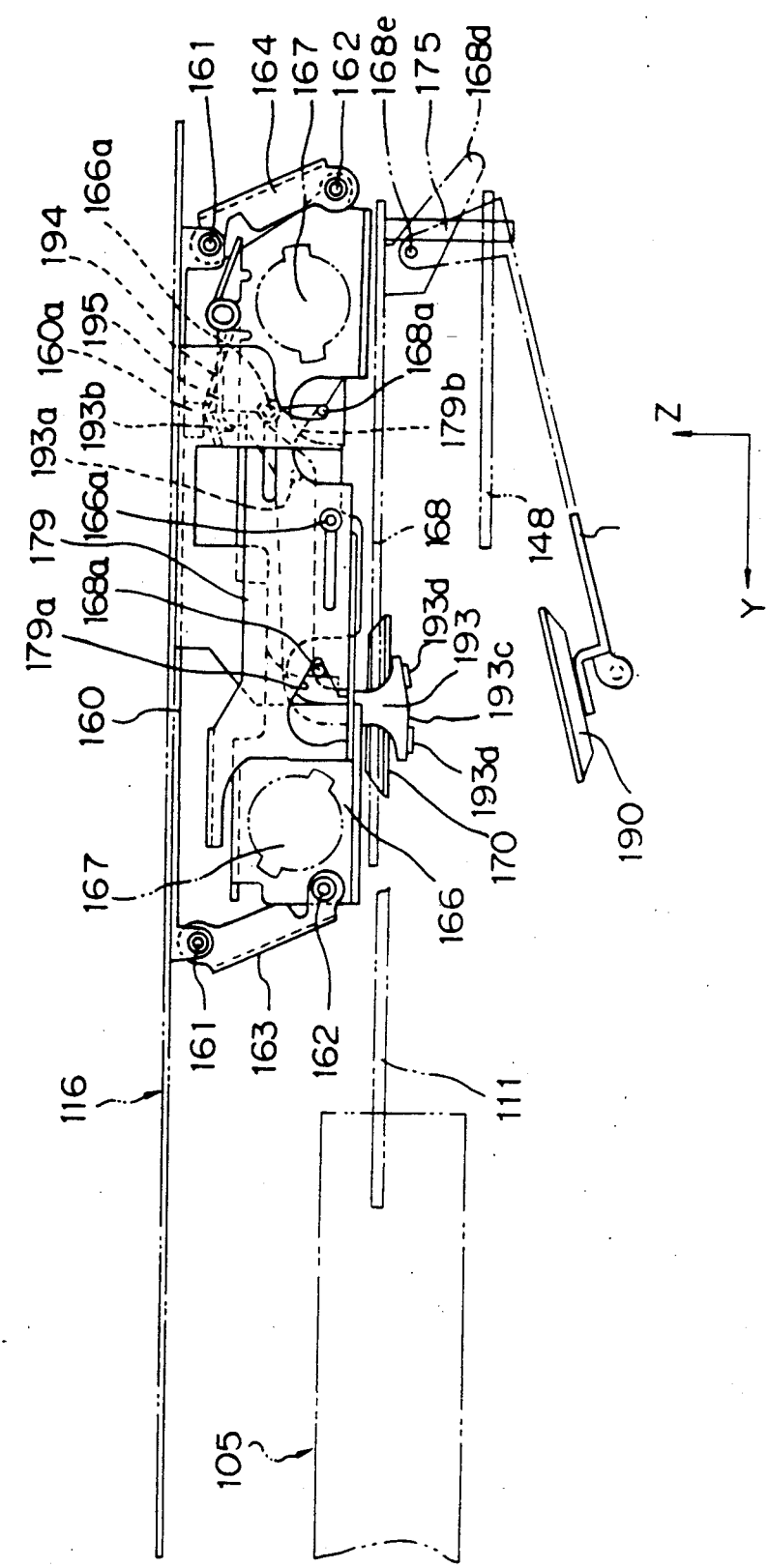
Figure 27:
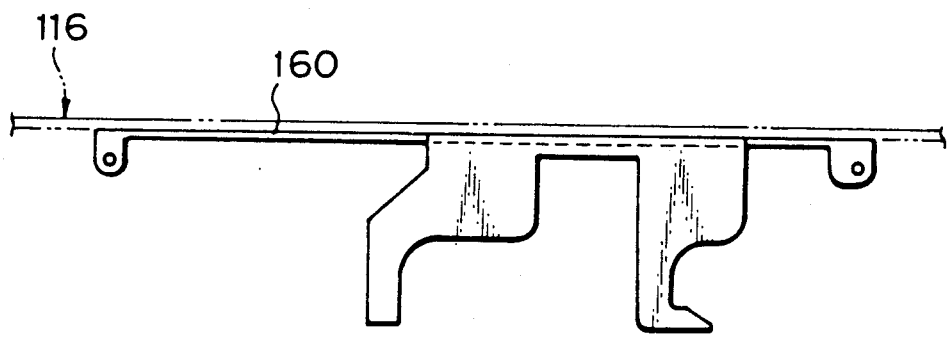
Figure 28:
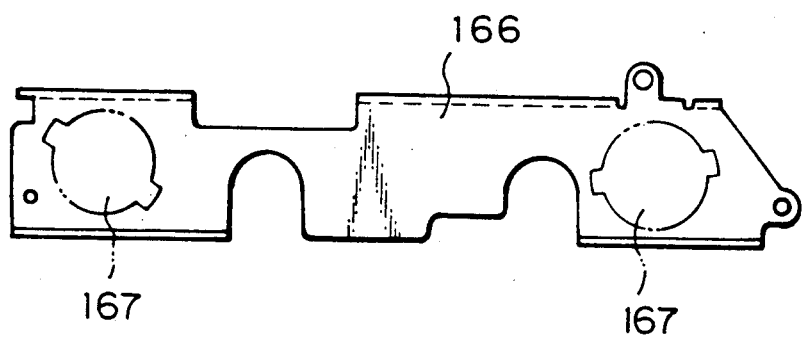

As shown in FIGS. 7 and 15, a base 160 in the form of a steel plate is fixed to the inner surface of a rear upper portion of the chassis 116. FIG. 25 is a view taken along line IIXV—IIXV of FIG. 15, and FIG. 26 is a view taken along line IIXVI—IIXVI of FIG. 25. As shown in FIGS. 25 and 26, a support member 166 is attached to the lower surface of the base 160 by a link mechanism or holder mechanism comprising a plurality of pins 161, 162 and swing arms 163, 164. In response to operation of the link mechanism, the support member 166 can move prescribed distances in the fore-and-aft directions (the direction of the arrow Y and the direction opposite thereto) and also in the vertical directions (the direction of the arrow Z and the direction opposite thereto). FIG. 27 shows in side elevation the base 160 only which is illustrated in FIG. 26, and FIG. 28 shows in side elevation the support member 166 only which is illustrated in FIG. 26.

As shown in FIGS. 25 and 26, a mechanism chassis 168 is mounted on the support member 166 through a vibration-resistant mechanism comprising four viscoelastic members 167. The mechanism chassis 168 is also shown in FIG. 5. As shown in FIG. 5, a turntable 170 is mounted on the mechanism chassis 168, which supports thereon a carriage 171 housing an optical pickup means. The carriage 171 is guided by a guide shaft 172 for movement in the fore-and-aft directions (the direction of the arrow Y and the direction opposite thereto) in a plane including the disc carrying surface of the turntable. Although not shown, a carriage driving means is also mounted on the mechanism chassis 168 for moving the carriage 171.

The mechanism chassis 168, the turntable 170, the carriage 171 including the optical pickup means, and the carriage driving means constitute a playback means for playing back discs.

The entire playback means is supported on the support member 166 (shown in FIGS. 25, 26, and 28) through the vibration-resistant mechanism composed of the viscoelastic members 167. The playback means and the support member 166b are mounted on the base 160 through the link mechanism for movement by prescribed distances in the fore-and-aft directions (the direction of the arrow Y and the direction opposite thereto) and also in the vertical directions (the direction of the arrow Z and the direction opposite thereto). The playback means and the support member 166 are vertically movable by about 3 mm, for example, in response to operation of the link mechanism. The disc carrying surface of the turntable 170 lies perpendicularly to the vertical directions (the direction of the arrow Z and the direction opposite thereto) in which the playback means and the support member 166b are movable, i.e., parallel to a plane including the fore-and-aft directions and the lateral directions (the direction of the arrow X and the direction opposite thereto).

The playback means and the support member 166 are made movable perpendicularly to the disc carrying surface of the turntable 170 for the reasons described below.

Since the tray 111 which projects out of the magazine 105 is in the form of a thin plate, as shown in FIGS. 5 and 26, the tray 111 is liable to be flexed transversely in the vertical directions when it is pushed out of the magazine 105. If the tray 111 is flexed or deformed to a large extent upwardly in the direction of the arrow Z, the tray 111 would contact the playback means including the turntable 170. To avoid this, when the tray 11 is pushed out of the magazine 105, the playback means is retracted in the direction in which the tray 111 is flexed, by a distance which is greater than the amount of flexing of the tray 111. In FIG. 26, the support member 166 is shown as being in an unretracted position where the support member 166 is not yet retracted with respect to the tray 111 to be pushed out of the magazine 105. When the link mechainsm composed of the pins 161, 162 and the swing arms 163, 164 is operated, the support member 166 can be moved about 3 mm upwardly (in the direction of the arrow Z) into a retracted position.

As depicted in FIGS. 5, 25, and 26, a pair of laterally spaced, downwardly extending shafts 175 is fixed to the lower surface of a rear end of the mechanism chassis 168 Which directly supports the playback means including the turntable 170. The shafts 175 are held in slidable contact with the rear end of the subchassis 148 (see FIGS. 7, 17, and 26) which is positioned downwardly of the mechanism chassis 168. FIG. 29 shows the manner in which the shafts 175 slidably engages the subchassis 148. As can be seen from FIG. 29, the shafts 175 are slidably held in contact with tongues 148d, 148e projecting from the rear end of the subchassis 148 in the direction opposite to the direction of the arrow Y. The engagement between the shafts 175 and the tongues 148e, 148d is effective in preventing the mechanism chassis 168 from which the shafts 175 project and also the support member 166 supporting the mechanism chassis 168 from slightly moving in the lateral directions (the direction of the arrow X and the direction opposite thereto). The link mechanism interposed between the support member 166 and the base 160 is a highly delicate mechanism and the the overall link mechanism is not so rigid. Therefore, when a relatively large shock is applied to the disc player, the link mechanism might be distorted to move the support member 166 held thereby into collision with other components. However, the support member 166 is prevented from abruptly moving under shocks since the shafts 175 projecting from the mechanism chassis 168 supported on the support member 166 are held in slidable contact with the tongues 148d, 148c of the subchassis 148 at all times.

A support member driving means for driving the support member 166 in response operation of the link mechanism will be described below.

As shown in FIGS. 25 and 26, a pair of lock plates 178, 179 is disposed in sandwiching the support member 166 in the lateral directions. As illustrated in FIG. 26, the lock plates 178, 179 are attached to the support member 166 by pins 166a for reciprocating movement by a certain interval in the fore-and-aft directions (the direction of the arrow Y and the direction opposite thereto). The lock plate 179 shown in FIG. 25 is illustrated in more detail in FIG. 30). The other lock plate 178 is substantially identical in configuration to the lock plate 179. The lock plate 179 has engaging portions 179a, 179b engageable with two lock shafts 168a projecting from the righthand end of the mechanism chassis 168 on which the turntable 170 and others are directly carried. Although not shown, the other lock plate 178 has an engaging portion engageable with a lock shaft 168b projecting from the lefthand end of the mechanism chassis 168.

As illustrated in FIG. 25, a pair of mutually crossing levers 181, 182 extending in the lateral directions is disposed on the front end of the support member 166. The levers 181, 182 are pivotably mounted at ends thereof to the support member 166 by means of respective pins 181a, 182a. The other ends of the levers 181, 182 are pivotally mounted on the front ends of the lock plates 178, 179 by respective pins 181b, 182b. The levers 181, 182 are pivotally coupled to each other by a pin 183 at their intermediate portions. When only the lever 181 is angularly moved, the other lever 182 is angularly moved in synchronism with the lever 181.

A rectangular movable plate 184 is disposed in front of the levers 181, 182, and mounted on the chassis 116 by a pin 184a for reciprocating movement in the fore-and-aft directions (the direction of the arrow Y and the direction opposite thereto). The movable plate 184 has a projecting pin 184b rotatably fitted in a slot 181d defined in the lever 181. The movable plate 184 can be moved by a motor 187 through a coupling mechanism 185 and a speed reducer mechanism 186.

More specifically, when the motor 187 is energized, the lock plates 178, 179 are moved in the forward and rearward directions through the speed reducer mechanism 186, the coupling mechanism 185, the movable plate 184, and the levers 181, 182. The lock plates 178, 179 then engage the lock shafts 168a, 168b to transmit a driving force to the mechanism chassis 168 which applies the driving force via the four viscoelastic members 167 to the support member 166. The link mechanism is now operated to move the support member 166.

The motor 187, the speed reducer mechanism 186, the coupling mechanism 185, the movable plate 184, the levers 181, 182, and the lock plates 178, 179 jointly provide a support member driving means for moving the support member 166.

The lock plates 178, 179 serve to lock the playback means to the player housing 102 when the support member 166 is in the unretracted position (shown in FIG. 26) with respect to the tray 111 pushed out of the magazine 105. When the support member 166 is in the unretracted position, no disk is played back. At this time, the lock plates 178, 179 lock the playback means by holding the engaging portions 179a, 179b in engagement with the lock shafts 168a, 167b on the mechanism chassis 168 that serves as a base member of the playback means. Under this condition, therefore, the playback means is prevented from moving even slightly even if a relatively large shock is applied to the disc player.

Angular movement of the pusher 149 shown in FIGS. 17 and 20 pushes the tray 112 carrying the disc 110 (FIG. 5) out of the magazine 105 for positioning the disc directly beneath the disc carrying surface of the turntable 170 in concentric relation thereto. At this time, the disc 110 and its tray 112 have reached a position near the turntable 170, but are not yet mounted on the turntable 170. It is therefore necessary to separate the disc 110 from the tray 112 by moving only the disc 110 a certain distance upwardly (in the direction of the arrow Z) perpendicularly to the disc carrying surface of the turntable 170, and to mount the disc 110 on the disc carrying surface of the turntable 170. This final movement of the disc 110 is effected by a disc clamp mechanism described below.

As shown in FIGS. 17, 25, and 26, a pair of laterally spaced brackets 168d is disposed on the rear end of the mechanism chassis 168, and a support body 189 is swingably attached to the brackets 168d by support pins 168e. The support pins 168e extend in the lateral directions (the direction of the arrow X and the direction opposite thereto) for causing the support body 189 substantially in the vertical directions (the direction of the arrow Z and the direction opposite thereto), i.e., within a plane normal to the disc carrying surface of the turntable 170 (shown in FIG. 5). A disc-shaped presser 190 is rotatably mounted on a free end of the support body 189 for abutting against the surface of the disc 110, confronting the disc carrying surface of the turntable 170, remote from the disc carrying surface, and for pressing the disc 110 against the disc carrying surface of the turntable 170. Although not illustrated, a coil spring is provided for normally urging the support body 189 in a direction to displace the presser 190 toward the disc carrying surface of the turntable 170.

As shown in FIGS. 17 and 26, a roller 189a is mounted on the distal end of the support body 189 in rolling contact with a cam 151f on the intermediate lever 151 shown in FIGS. 17 and 21. Therefore, upon turning movement of the intermediate lever 151, the support body 189 is swung under the resiliency of the coil spring.

The intermediate lever 151, the driving means including the motor 153 for rotating the intermediate lever 151, the support body 189, and the coil spring (not shown) jointly serve as a presser moving means for mounting the presser 190 on and dismounting the presser 190 from the disc carrying surface of the turntable 170. The presser moving means and the presser 190 constitute a disc clamp mechanism for clamping a disc on the turntable 170. As described above, the disc 110 carried on the tray 112 pushed out of the magazine 105 is lifted by the disc clamp mechanism for a prescribed interval, and then mounted and clamped on the disc carrying surface of the turntable 170.

As illustrated in FIGS. 25 and 26, a pair of holders 193 is swingably attached by respective pins 193a to the lateral side panels of the support member 166 on which the playback means including the turntable 170 is supported by the four viscoelastic members 167. FIG. 31 shows one of the holders 193 in side elevation. The holders 193 serve as a disc holder means for cooperating with the presser 190 of the disc clamp mechanism in sandwiching the disc 110 lifted by the presser 190. The holders 193 are swingable in a plane normal to the disc carrying surface of the turntable 170, as is the case with the support body 189 of the disc clamp mechanism. As illustrated in FIGS. 26 and 31, each of the holders 193 has an arm 193b on a free end thereof which is smoothly held against a bearing portion 160a on the base 160 by a biasing plate 195 which is urged by a spring 194 (see FIG. 26 in particular). With this arrangement, the holder 193 is swung in response to movement of the support member 166 with respect to the base 160, for moving another free end of the holder 193 into and out of the disc carrying surface of the turntable 170. The free end of the holder 193 which can thus move into and out of the disc carrying surface has a disc engaging surface 193d for abutting against the disc 110. The disc engaging surface 193d has a certain curvature in the directions in which the holder 193 is swingable, for permitting smooth abutting engagement with the disc 110. Two members 193d of a high coefficient of friction are disposed on the disc engaging surface 193c for abutting against the surface of the disc 110 to prevent the disc 110 from being displaced radially while the holder 193 is swinging.

The disc holder means comprising the disc holders 193 serves to keep the disc 110, which has been lifted by the disc clamp mechanism, parallel to the disc carrying surface of the turntable 170, and also to prevent the disc 110 from being displaced radially. Since the disc holder means is operated by the driving force from the support member driving means (described above), no dedicated driving means for driving the disc holder means is necessary, so that the disc player is small in overall size and low in cost, and the electric power consumption which would otherwise be required by a motor or the like used as such a dedicated driving means can be eliminated.

The magazine carriage 123, the driving means for moving the carriage 123, the movable plates 125, 126, the driving force imparting means including the motor 131 for imparting a driving force to the movable plates 125, 126, the pusher means including the pusher 149 for pushing the trays 111, 112 out of the magazine 105, the disc clamp mechanism, the disc holder means including the holders 193, and associated small components jointly constitute a disc transfer mechanism for successively selecting desired discs from the magazine 105 and transferring one disc, at at time, onto the disc carrying surface of the turntable 10.

Figure 32:
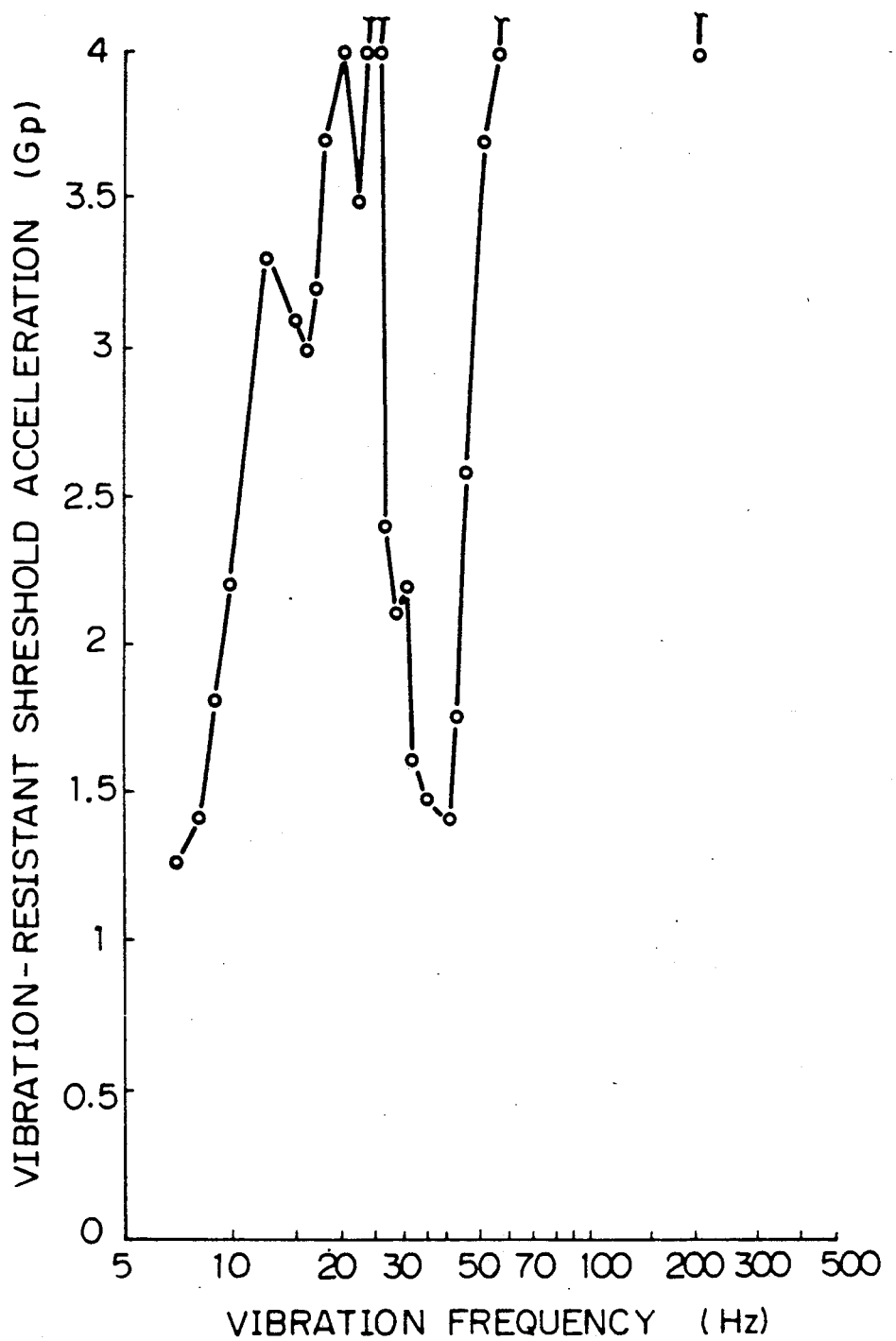
FIGS. 32(a), 32(b), and 33 are diagrams illustrating data of vibration absorption by the damper.
Figure 32:
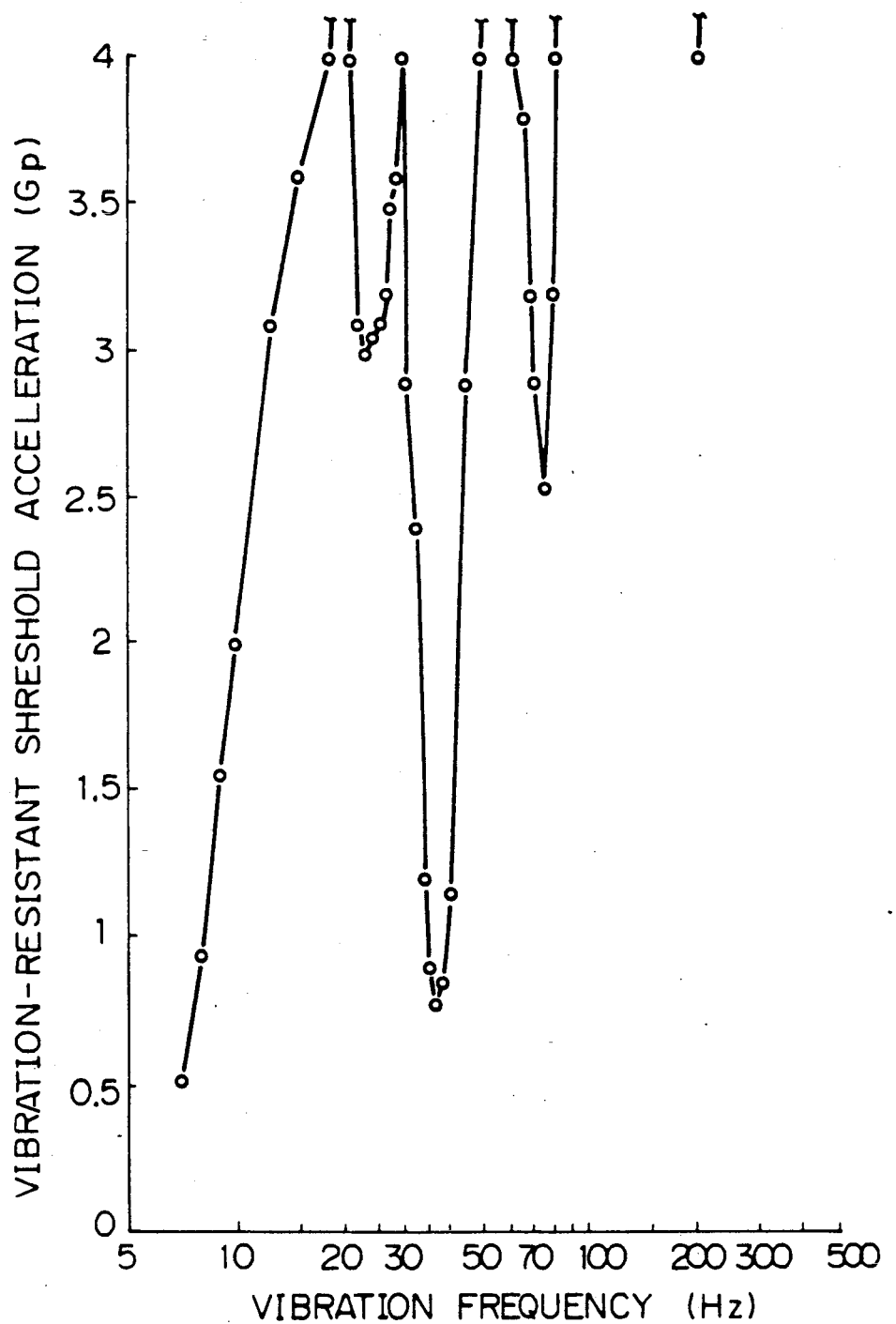
Figure 33:
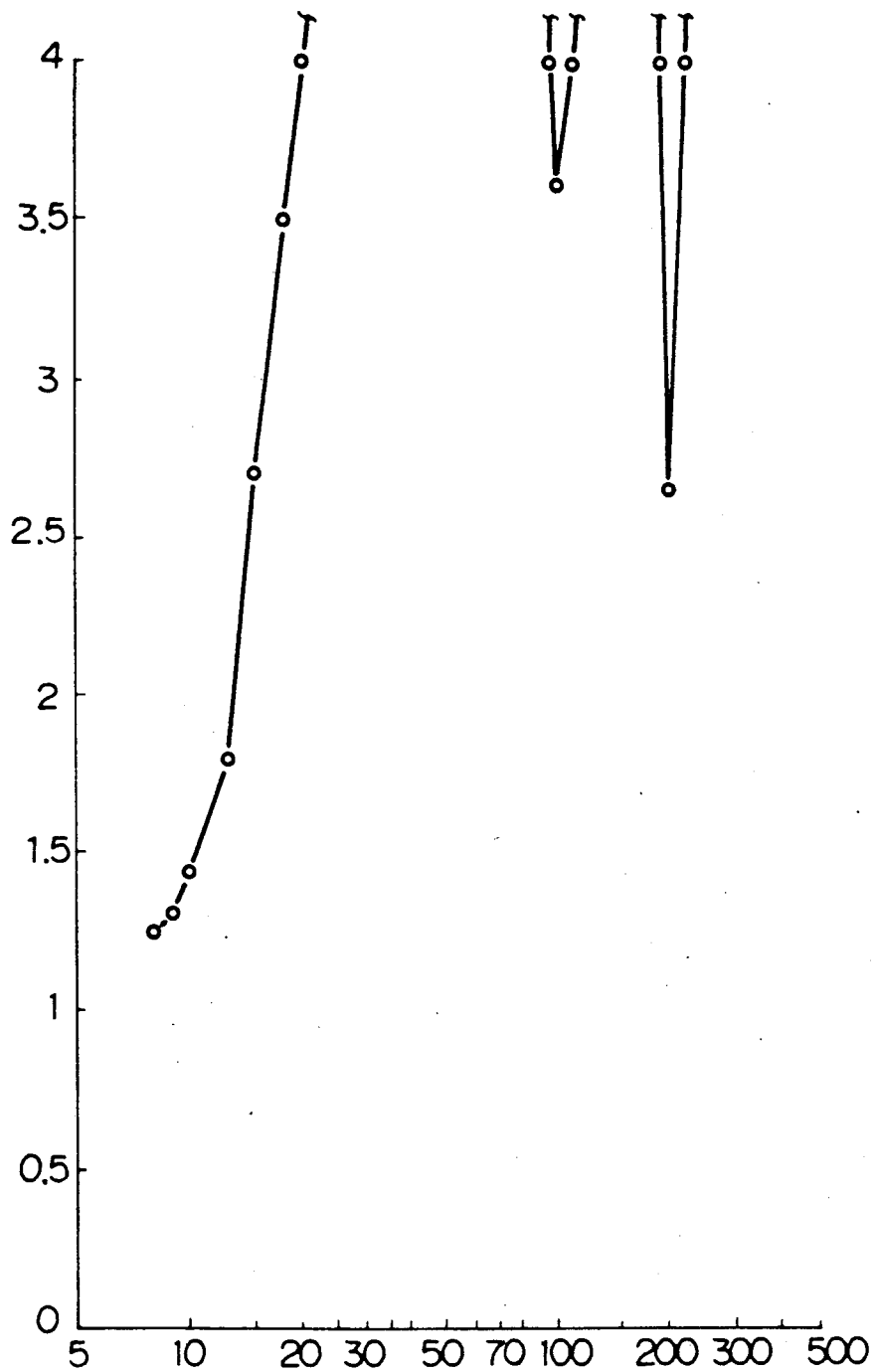

The vibration absorbing effect of the air dampers 120, 121 disposed between the player housing 102 and the chassis 116 as shown in FIGS. 4, 5, 7, 12, and 13 will now be described hereinbelow. FIG. 32(a) shows data on the vibration absorbing effect of the air dampers 121 interposed between the side ends of the chassis 116 and the player housing 102 on laterally applied vibration. FIG. 32(b) shows data on the vibration absorbing effect of ordinary rubber dampers used in place of the air dampers 121. The term "vibration-resistant threshold acceleration" used in the graphs of FIGS. 32(a) and 32(b) means the value of threshold vibratory acceleration beyond which the disc player would fail to properly reproduce the recorded material from the disc because of skipping some of the recorded material. FIGS. 32(a) and 32(b) clearly show that use of the air dampers results in higher vibration-resistant threshold acceleration than the ordinary rubber dampers, and hence in a higher vibration-absorbing effect. FIG. 33 illustrates data on the vibration-absorbing effect of the other air dampers 120 disposed between the upper end of the chassis 116 and the player housing 102 on vertically applied vibration.

Signals issued from the detector switches as described above are supplied to the control unit (CPU) which generates operation signals to operate the motors 131, 153, 187, and a turntable spindle motor 170.

Figure 34:
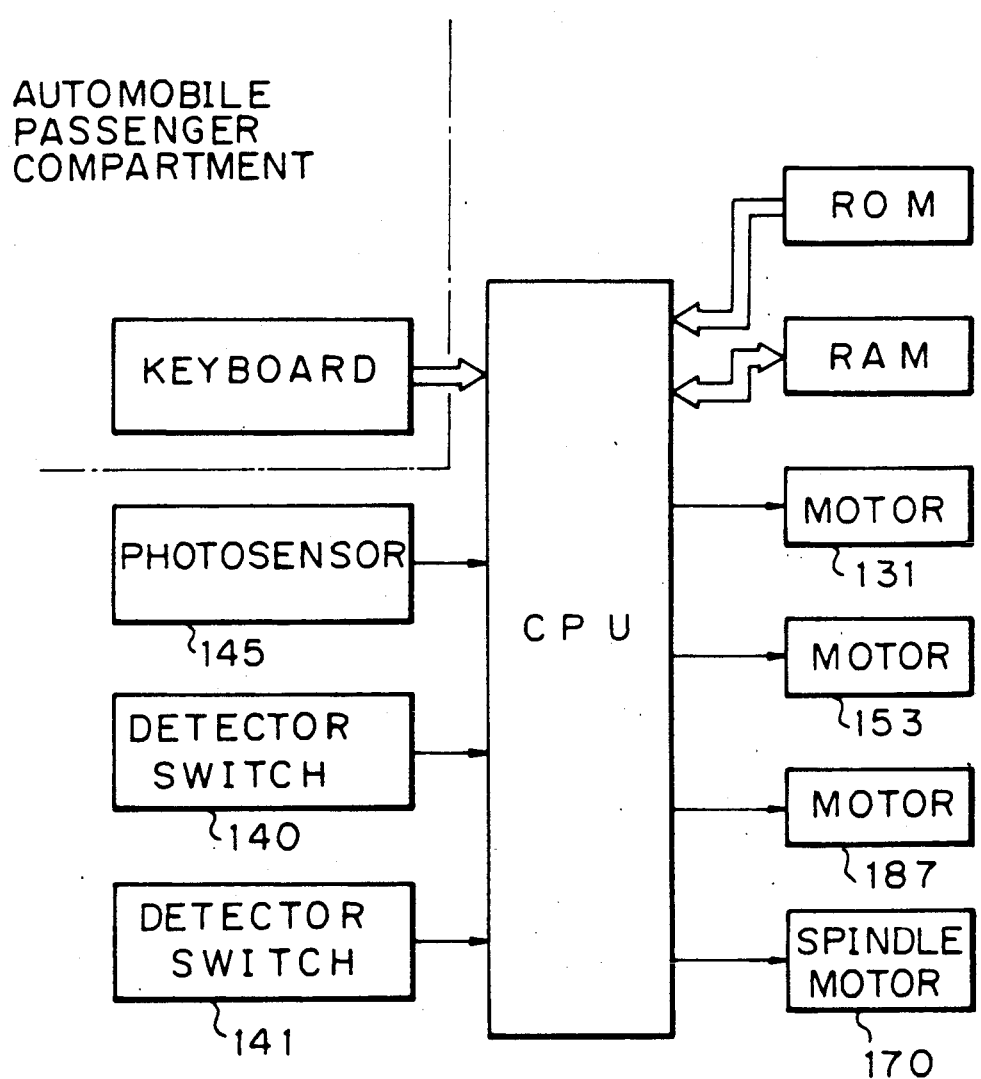
FIG. 34 is a block diagram of a control system of the multiple-disc player according to the invention.

The multiple-disc player of the foregoing construction is installed in the trunk of an automobile. In operation, the operator opens the lid 106 and insert the magazine 105 through the opening 103a into the player. A selected disc can be loaded, played back, and unloaded in the multiple-disc player by energizing the motors in a predetermined sequence. Such sequence control is executed by the CPU, which is of an arrangement shown in FIG. 34, in response to a command input entered through a keyboard or a remote control unit in the passenger compartment of the automobile. When a disc to be played back is specified by the keyboard, the CPU energizes the motor 131 to move the movable plates 125, 125 in the forward direction (indicated by the arrow Y) or the rearward direction. The pins 123a movably fitted in the staircase cam grooves 125c, 126c and the guide grooves 116b in the chassis 116 are caused to move vertically to move the carriage 123. Therefore, the magazine 105 carried on the carriage 123 is also moved to bring the tray 111 or 112 which holds the disc selected to be played back into a position where the tray can be engaged by the pusher 149 shown in FIG. 17.

Then, the motor 153 starts rotating to turn the pusher 149 through the intermediate lever 151, the lever 156, and the slider 155. The tray (such as the tray 112) holding the disk to be played back is thus pushed out of the magazine 105 to move the disc into a position concentric with the disc carrying surface of the turntable 170, i.e., immediately below the disc carrying surface.

In response to turning movement of the intermediate lever 151, the disc clamp mechanism shown in FIGS. 17 and 27 is also actuated to elevate the disc from the tray 112 mount and clamp the disc on the turntable 170. As the disc is thus moved, the motor 187 is energized to cause the link mechanism to lift the support member 166 together with the playback means mounted thereon by about 3 mm for thereby retracting the playback means, including the turntable 170, into a position out of interference with the tray 112 pushed from the magazine 105. Synchronously with this movement of the support member 166, the presser 190 shown in FIGS. 25 and 26 is also angularly moved. At the time the disc is clamped on the turntable 170, the presser 190 is slightly spaced from the disc so as not to interfere with rotation of the turntable 170 and the disc.

Then, the turntable 170 is rotated, and the carriage 171 supporting the optical pickup means is actuated to start playing back the disk on the turntable 170.

When the playback of the disc is completed, the disc is stored back into the magazine in a process which is a reversal of the aforesaid disc loading process. The above cycle is repeated until all selected discs are played back.

In the multiple-disc player of the present invention, the support member 166 which supports the playback means including the turntable through the vibration-resistant mechanism is movable between retracted and unretracted positions with respect to a tray which has been pushed out of the disc holder or magazine. When the support member is in the unretracted position, i.e., when no disc is played back, the playback means is fixed to the player housing by the lock mechanism.

Therefore, even when the disc player is subjected to a relatively large shock, the playback means is not displaced into abrupt collision with the player housing. As a consequence, the playback means is protected by the vibration-resistant mechanism from external vibration and also from automobile vibration and relatively large shocks during transportation. The playback means is thus rendered highly resistant to vibration.

Although a certain preferred embodiment has been shown and described, it should be understood that many changes and modifications may be made therein without departing from the scope of the appended claims.

What is claimed is:

1. A multiple-disc player comprising:

a player housing;

playback means disposed in said player housing and including a turntable having a disc carrying surface;

support means for supporting said playback means;

a disc holder magazine insertably mounted in a storage area in said player housing and having a disc outlet opening, for storing an array of discs in a direction transverse to the disc carrying surface of said turntable, said disk holder magazine having a disc holder casing and a plurality of plate-like trays for holding the discs, respectively, in their major surfaces, said plate-like trays being movable into and out of said disc holder casing along the major surfaces; and a disc transfer mechanism for selecting and transferring a selected one, at a time, of the discs in said disc holder magazine onto said disc carrying surface, said disc transfer mechanism having positioning means for positioning said support means relative to said disc holder magazine, and pusher means for pushing one, at a time, of said trays out of said disc holder casing, wherein said support means comprises:

a support member supporting said playback means by a vibration-resistant mechanism;

a holder mechanism for holding said support member movably between a retracted position and a rest position corresponding to the passage of said tray into and out of said disc holder casing;

support member driving means for positioning said support member at either one of said retracted and rest positions;

a lock mechanism for fixing said playback means to said player housing when said support member is in said rest position; and link means connecting said support member to said housing for permitting the movement of said support member between said retracted position and said rest position, said link means including a swing arm, a first pin fixed to said housing and a second pin fixed to said support member, said swing arm being pivotably mounted to said first and second pins; and disc holding means mounted on said support member for movement into and out of the disc carrying surface of said turntable, said disc holding means having a disc engaging surface for abutting a disc transferred to said playback means upon movement of said support member to said retracted position, said disc holding means maintaining a disc transferred to the turntable substantially parallel to said disc carrying surface.

2. A multiple-disc player according to claim 1, wherein said lock mechanism includes means for preventing said playback means from moving in the direction transverse to said disc carrying surface.

3. A multiple-disc player according to claim 1, and further comprising a base supporting said playback means on said support member, and wherein said lock mechanism comprises engaging means movable between a first position in which the engaging means engages said base and a second position in which the engaging means is held out of engagement with said base, and driving means for moving said engaging means between said first and second positions.

4. A multiple-disc player according to claim 3, wherein said engaging means comprises a pair of engaging members sandwiching said base in a plane parallel to said disc carrying surface, and wherein said driving means includes means for moving said engaging members in synchronism with each other.

5. A multiple-disc player according to claim 4, wherein said driving means comprises a pair of levers pivotably mounted on said support member and having free ends pivotally coupled to said engaging members, respectively, and driving force imparting means for imparting a driving force to said levers.

6. A multiple-disc player according to claim 1 and further comprising limiting means for limiting movement of said support member in along a direction transverse to a path of movement of said support member.

7. A multiple-disc player according to claim 6, wherein said limiting means comprises a limiting member held in slidable contact with said support member.

8. A multiple-disc player according to claim 1 wherein said holder mechanism comprises a plurality of swing arms pivotably mounted on said player housing and having free ends on which said support member is pivotally supported.

9. A multiple-disc player comprising:
a player housing including a storage area;
playback means disposed in said player housing and including a turntable having a disc carrying surface;
a support member for supporting said playback means;
a disc holder insertably mounted in said storage area of said player housing and having a disc insert opening, said disc holder comprising a plurality of trays disposed along a direction transverse to said disc carrying surface, each tray holding a disc and being movable into and out of said disc holder;
disc transfer means for selecting a selected one of a plurality of discs stored by said disc holder and transferring said selected one from said disc holder to said disc carrying surface of said turntable, said disc transfer means having positioning means for positioning said playback means relative to said disc holder, and disc withdrawing means for pushing said selected one of said discs out of said disc holder by withdrawing the corresponding tray from said disc holder holding said selected disc;
support member moving means for moving said support member between a retracted position at which said selected disc is transferred by said disc transfer means from said disc holder to said playback means to be played back by said playback means, and a rest position at which no disc is played back by said playback means;
locking means for rigidly securing said playback means to said player housing when said support member is in said rest position;
link means connecting said support member to said housing for permitting the movement of said support member between said retracted position and said rest position, said link means including a swing arm, a first pin fixed to said housing and a second pin fixed to said support member, said swing arm being pivotably mounted to said first and second pins; and
disc holding means mounted on said support member for movement into and out of the disc carrying surface of said turntable, said disc holding means having a disc engaging surface for abutting a disc transferred to said playback means upon movement of said support member to said retracted position, said disc holding means maintaining a disc transferred to the turntable substantially parallel to said disc carrying surface.

10. The multiple-disc player of claim 9, and further comprising a mechanism chassis supporting said turntable, a mechanism subchassis including a pair of tongues and first and second chassis shafts fixed to said mechanism chassis and held in slidable contact with said tongues for preventing abrupt movement of said support member caused by undesired shocks.

11. The multiple-disc player of claim 10, wherein said locking means comprises:
a pair of lock plates each having first and second slots therein, first and second surface engaging portions and first and second crossing lever mounting pins;
a pair of lock plate pins fixed to said support member and received by the slots of each of said lock plates for defining reciprocating movement of said lock plates;
first and second lock shafts fixed to said mechanism chassis and being engageable by said first and second surface engaging portions of each of said lock plates;
first and second crossing levers extending across said support member substantially transverse to said lock plates;

a crossing lever pin fixed to said support member for mounting said first and second crossing levers at one end thereof, the other ends of said first and second crossing levers being mounted to said first and second crossing lever mounting pins, respectively, on said first and second lock plates;

a lever pivoting pin mounted through said first and second crossing levers so that angular movement of one of said crossing levers causes synchronized angular movement of the other of said crossing levers; said support member moving means comprising:

motor means;

speed reducing means for transferring the motion of said motor means at a lesser speed than that of said motor means;

a movable plate having a projecting pin received by a slot in said first crossing lever and a slot;

a movable plate pin received by said slot of said movable plate for limiting reciprocating motion of said movable plate; and coupling means for coupling the rotational motion of said motor means transferred by said speed reducing means to reciprocating motion for moving said movement plate which in turn causes said lock plates to move and engage the lock shafts for transmitting a driving force to said mechanism chassis which actuates said link mechanisms to move said support member between said retracted and unretracted positions.

12. The multiple-disc player of claim 11, wherein said lock plates lock the playback means by holding the engaging surface portions thereof in engagement with said lock shafts on the mechanism chassis.

* * * * *